United States Patent
Lauridsen et al.

(10) Patent No.: US 7,904,818 B2
(45) Date of Patent: Mar. 8, 2011

(54) SUMMARIZING PORTLET USAGE CAPTURED RESPONSIVE TO TRIGGER EVENTS IN A PORTAL PAGE

(75) Inventors: Christina K. Lauridsen, Austin, TX (US); Malcolm C. Ong, Pflugerville, TX (US); Lauren G. Wilcox, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 784 days.

(21) Appl. No.: 11/872,241

(22) Filed: Oct. 15, 2007

(65) Prior Publication Data

US 2009/0100372 A1 Apr. 16, 2009

(51) Int. Cl.
*G06F 3/00* (2006.01)
*G06F 15/173* (2006.01)

(52) U.S. Cl. ......... 715/742; 715/704; 715/738; 715/866; 709/224

(58) Field of Classification Search .................. 715/254, 715/704, 738, 742, 744, 745, 789, 811, 866, 715/760; 707/E17.116; 709/224
See application file for complete search history.

(56) References Cited

U.S. PATENT DOCUMENTS

| | | | |
|---|---|---|---|
| 6,941,339 B1 | 9/2005 | McMichael | |
| 6,959,319 B1 * | 10/2005 | Huang et al. | 709/203 |
| 7,003,735 B2 * | 2/2006 | Edlund et al. | 715/810 |
| 7,139,978 B2 * | 11/2006 | Rojewski et al. | 715/744 |
| 7,178,096 B2 * | 2/2007 | Rangan et al. | 715/202 |
| 7,185,089 B2 * | 2/2007 | Satomi et al. | 709/224 |
| 7,203,909 B1 * | 4/2007 | Horvitz et al. | 715/765 |
| 7,337,370 B2 * | 2/2008 | Haynes et al. | 714/47 |
| 7,770,101 B2 * | 8/2010 | Hesmer et al. | 715/221 |
| 2002/0029296 A1 * | 3/2002 | Anuff et al. | 709/311 |
| 2002/0152242 A1 | 10/2002 | Meyer et al. | |
| 2004/0049589 A1 * | 3/2004 | Papanikolaou et al. | 709/229 |
| 2004/0243928 A1 | 12/2004 | Hesmer et al. | |
| 2005/0256940 A1 | 11/2005 | Henderson et al. | |
| 2005/0267789 A1 | 12/2005 | Satyadas | |

(Continued)

OTHER PUBLICATIONS

Jing Wu, et al., "Mining Personalization Interest and Navigation Patterns of Portal," Advances in Knowledge Discovery and Data Mining, Berlin, Heidelberg, vol. 4426, May 22, 2007, pp. 948-955.

(Continued)

*Primary Examiner* — Tadeese Hailu
*Assistant Examiner* — Nicholas S Ulrich
(74) *Attorney, Agent, or Firm* — David A. Mims, Jr.; Amy J. Pattillo

(57) ABSTRACT

A portal summary controller monitors usage metadata indicating current usage of at least one portlet within at least one portal page for one of multiple events specified to trigger storage of the usage metadata. Responsive to detecting one of the multiple events within the usage metadata which triggers storage, the portal summary controller stores the detected usage metadata at a current time of at least one instance of at least one portlet application within the at least one portal page. Subsequent to storing separate detected usage metadata at multiple different times, the portal summary controller dynamically creates a summary portal page displaying a separate instance of the at least one portlet application for at least one of each of the multiple different times specified according to the separate usage metadata stored at each of the multiple different times, such that the summary portal page provides a summary of at least a selection of previous usage metadata selected by a user of the at least one portal page based on usage metadata stored responsive to trigger events.

18 Claims, 7 Drawing Sheets

U.S. PATENT DOCUMENTS

| | | | |
|---|---|---|---|
| 2005/0273717 | A1 | 12/2005 | Breeden et al. |
| 2005/0278323 | A1 | 12/2005 | Horvitz et al. |
| 2005/0278562 | A1* | 12/2005 | Haynes et al. ............ 714/4 |
| 2006/0036734 | A1 | 2/2006 | Breeden |
| 2006/0053376 | A1* | 3/2006 | Ng et al. ............ 715/742 |
| 2006/0059125 | A1* | 3/2006 | Yan ............ 707/3 |
| 2006/0095676 | A1 | 5/2006 | Dzierzon |
| 2006/0277199 | A1* | 12/2006 | Joret et al. ............ 707/10 |
| 2007/0038599 | A1* | 2/2007 | Pearson ............ 707/3 |
| 2007/0300179 | A1* | 12/2007 | Friedlander ............ 715/781 |
| 2008/0091985 | A1* | 4/2008 | Haynes et al. ............ 714/57 |

OTHER PUBLICATIONS

Lauridsen et al, "Summarizing Portlet Usage in a Portal Page", Co-Pending U.S. Appl. No. 11/872,238, filed Oct. 15, 2007, 48 pages.

Patil, Aashish, "Unclog the Server Bottleneck With Active Containers", Java Technology Article, Apr. 6, 2004, [Online], [Retrieved on Aug. 21, 2007]. Retrieved from the Internet <URL: http://www-128.ibm.com/developerworks/web/library/wa-actcont/index.html>.

"IBM File Server", Online Manual for Websphere Portal Version 5.1, copyright International Busienss Machines Corporation, Jun. 14, 2007 [Online], [Retrieved on Aug. 21, 2007]. Retrieved from the Internet <URL:http://publib.boulder.ibm.com/infocenter/wpdoc/v510/index.jsp?topic=/com.ibm.wp.zos.doc/portlets/file_server.html>.

Allamaraju, Subbu, "Portlet Preferences", article under Dev2Dev, Feb. 2, 2004 [online], [retrieved on Aug. 21, 2007]. Retrieved from the Internet <URL: http://dev2dev.bea.com/pub/a/2004/02/portlet_preferences.html>.

Hepper et al, "caching data in JSR 168 portlets with Websphere Portal V5.1", Websphere Article, Aug. 31, 2005, [online], [retrieved on Aug. 21, 2008]. Retrieved from the Internet <URL:http://www-128.ibm.com/developerworks/websphere/library/techarticles/0508_hepper/0508_hepper.html>.

Offline Portal Content, Everyplace Access Services for Websphere Software, [online], [retrieved on Aug. 21, 2007]. Retrieved from the Internet <URL: http://publib.boulder.ibm.com/infocenter/weahelp/5.1/index.jsp?topic=/com.ibm.websphere.eas.doc/ovr_offline.html>.

Offline Content, Everplace Access Services for Websphere Software, [online], [retrieved on Aug. 21, 2007]. Retrieved from the Internet <URL: http://publib.boulder.ibm.com/infocenter/weahelp/5.1/index.jsp?topic=/com.ibm.websphere.eas.doc/dev_offline.html>.

JSR 162: Portlet API, Jan. 22, 2002, [online], [retrieved on Aug. 21, 2007]. Retrieved from the Internet <URL:http://www.jcp.org/en/jsr/detail?id=162>.

* cited by examiner

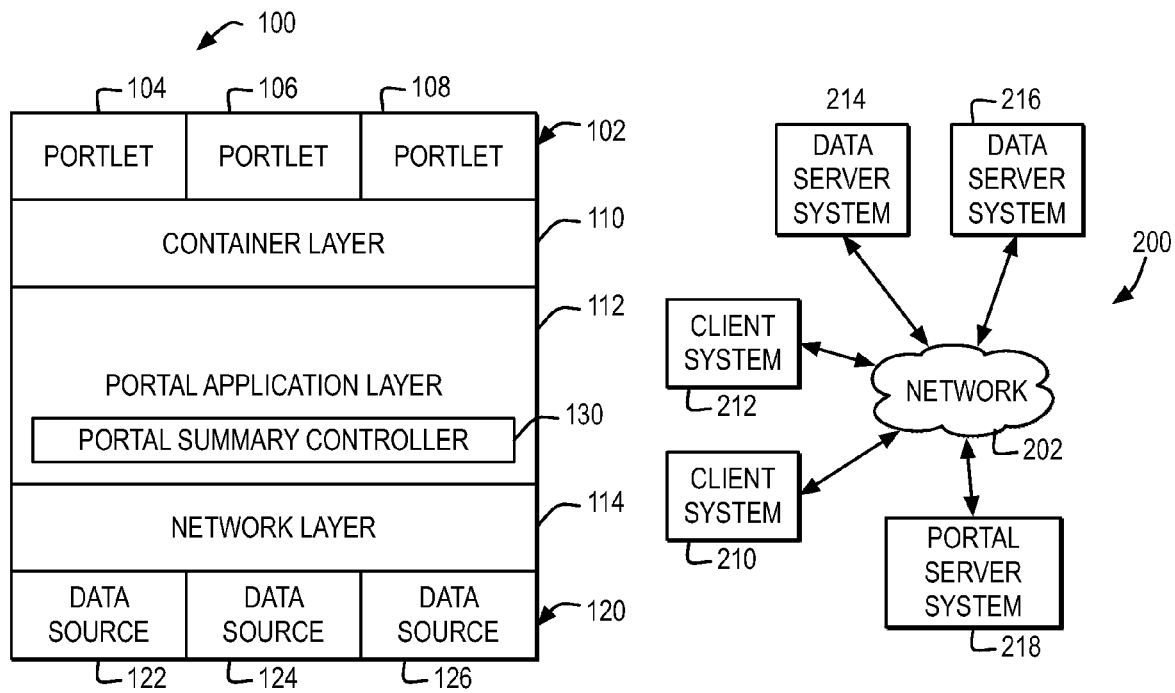
FIG. 1
FIG. 2
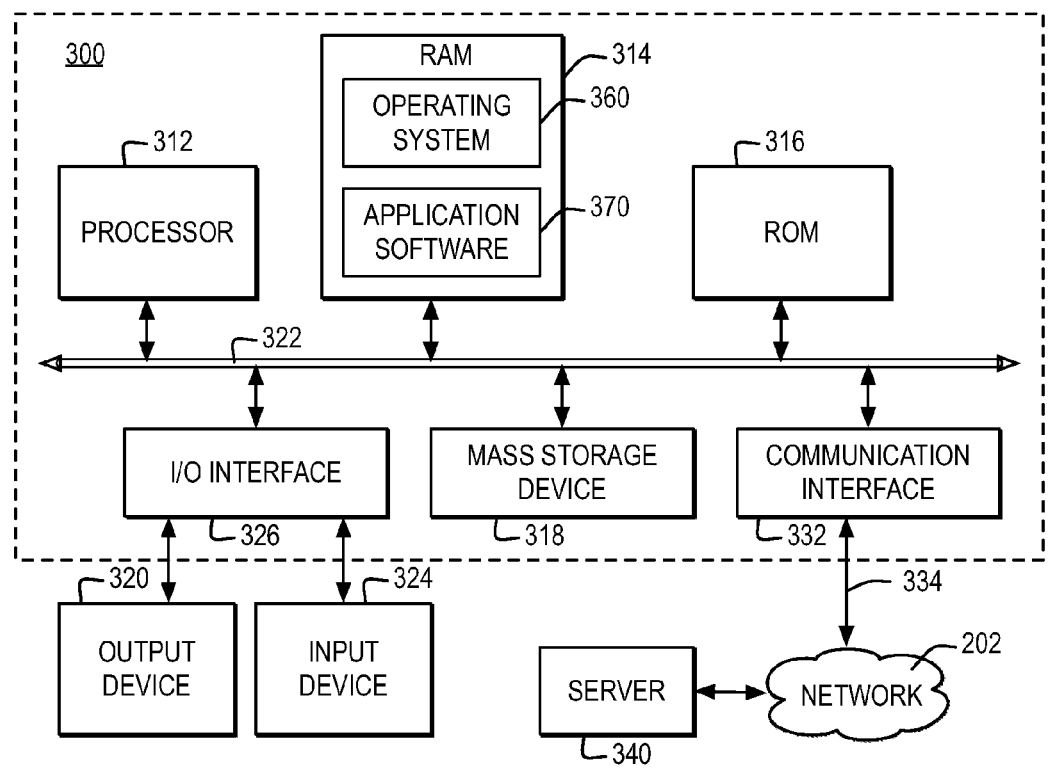
FIG. 3

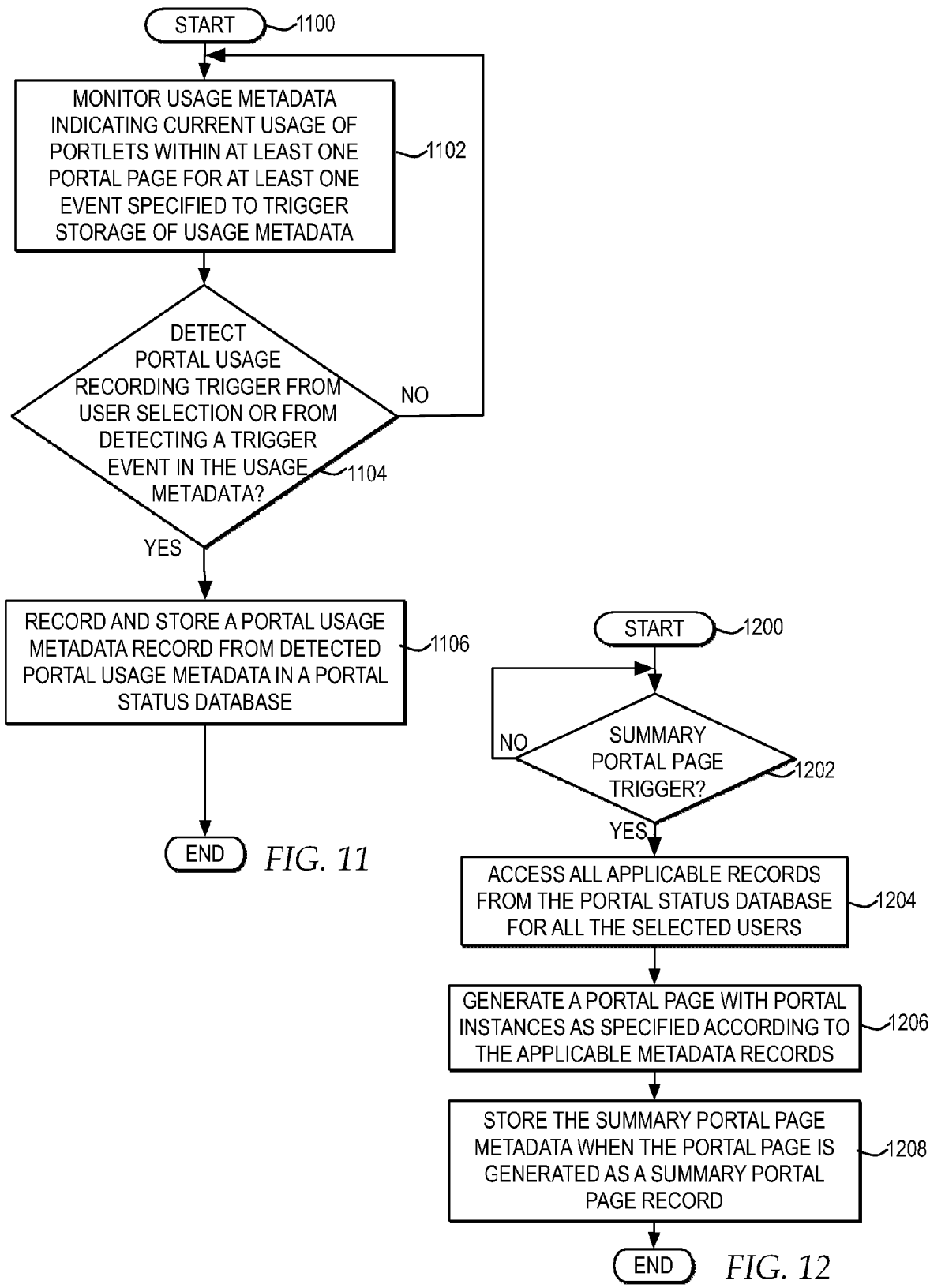

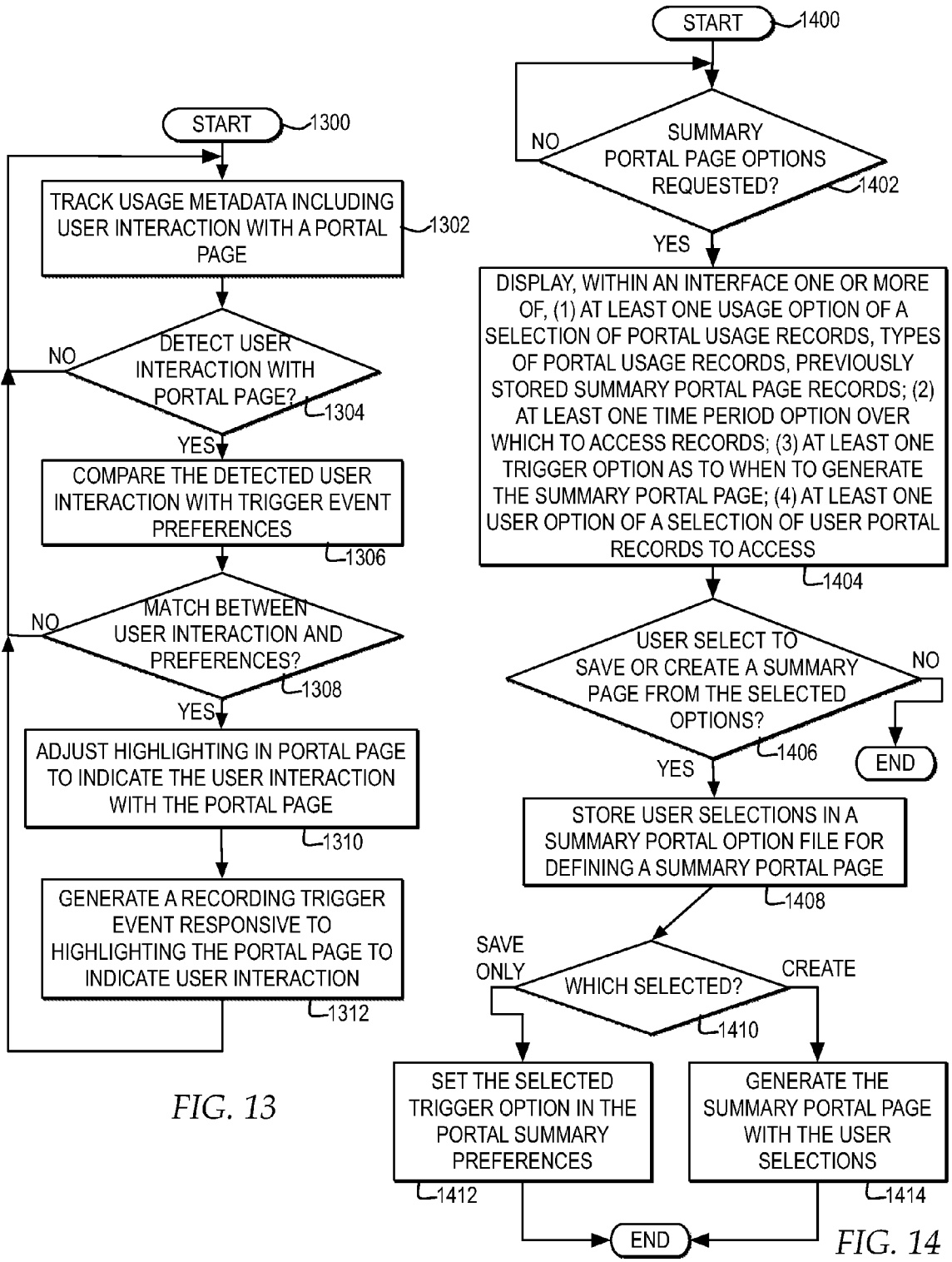

SUMMARIZING PORTLET USAGE CAPTURED RESPONSIVE TO TRIGGER EVENTS IN A PORTAL PAGE

CROSS-REFERENCE TO RELATED APPLICATIONS

The present application is related to co-pending application:

1) U.S. patent application Ser. No. 11/872,238, filed Oct. 15, 2007.

BACKGROUND OF THE INVENTION

1. Field of the Invention

The present invention relates generally to an improved data processing system and, in particular to an improved computer implemented method, system, and computer program product for monitoring and saving portlet usage, responsive to user generated and automated trigger events, and subsequently generating a portal page displaying one or more portlets as used at a particular point in time or over a period of time by at least one user.

2. Description of the Related Art

As networks, such as the Internet, become more and more pervasive for content delivery and communication, better methods for displaying web contents and accessing web applications are being developed. One example of a technology that efficiently displays web content and accesses web applications is a portal. Portal programs or portal applications, whether run on a server delivering content or on a client system receiving content, provide an entry point for websites and back-end applications through a portal page viewable at a client system.

In one example, a portal application generates a portal page that includes instances of portlets. In general, a portlet is a web-based application that processes requests and generates dynamic content. End-users see an instance of a portlet as a specialized content area within a portal page. Depending on the content nature of the portlet, the user may select to view different types of content within the portlet instance or content area. For example, some portlets are database driven applications that access data from remote data sources based on the currently selected option from a list of data options available for the portlet instance and present the accessed data to the user through dynamically generated content, or markup fragments.

A portal page including instances of multiple database driven portlets may access live data for currently selected data options from different sources, bring all the data into a common portal page, and display dynamically generated graphical representations of the accessed live data by each of the portlet instances. Thus, through a portal page, the data that a user previously had to access through many separate windows, each displaying one type of data, the user can now view accumulated on one page, but still separately graphically represented. For example, instead of a user having to separately access web pages for each of news, sports scores, and stock prices and separately access productivity applications, such as calendars, for project progress, calendaring changes, and other productivity data, the user accesses one portal page which includes instances of multiple database driven portlets for separately displaying, within a single page, data from news, sports scores, and stock prices to project progress, calendaring changes, and other productivity data.

While the portal page with multiple portlet instances provides the user with a quick, single page in which to view multiple types of data from multiple sources as the data changes, users may need to rely on the data accessed in a portlet instance. Currently, portal pages that include portlets are limited, however, because once a portlet updates displayed data within the portlet instance, the previously displayed data is no longer available to the user. In addition, portals are limited because as a user adjusts which portlets are displayed within a portal page or the user adjusts the selected data option within a database driven portlet instance, the previous configuration of portlet instances and the previously selected data options are no longer available.

SUMMARY OF THE INVENTION

Therefore, the present invention provides a method, system, and program product for monitoring and saving portal usage responsive to user generated and automated trigger events, where portal usage includes the state of a portlet instance including current content dynamically generated for and displayed within portlet instances placed within a portal page and the current data option selections for portlet instances within the portal page. In addition, portal usage includes the event which triggered storing portal usage and a timestamp when the portal usage is captured, where the timestamp includes a clock time and any times tracked within the portlet, such as a current play time for media viewed within the portlet instance. In addition, in view of the foregoing, there is a need for a method, system, and program, subsequent to monitoring and saving portal usage, for creating an additional portal page and displaying a configurable summary of portlet instances specified according to the saved portal usage by at least one user. In particular, there is a need for a method, system, and program for generating and displaying a summary portal page including only a user designated selection of the stored portal usage of individual portlets, such that the summary portal page renders a summary of only that content selected by the user.

In one embodiment, a portal summary controller monitors usage metadata indicating current usage of at least one portlet within at least one portal page for one of multiple events specified to trigger storage of the usage metadata. Responsive to detecting one of the multiple events within the usage metadata which triggers storage, the portal summary controller stores the detected usage metadata at a current time of at least one instance of at least one portlet application within the at least one portal page. Subsequent to storing separate detected usage metadata at multiple different times, the portal summary controller dynamically creates a summary portal page displaying a separate instance of the at least one portlet application for at least one of each of the multiple different times specified according to the separate usage metadata stored at each of the multiple different times, such that the summary portal page provides a summary of at least a selection of previous usage metadata selected by a user of the at least one portal page based on usage metadata stored responsive to trigger events.

Events specified to trigger storage of usage metadata include adding a portlet instance to a portal page, opening or closing a portal page, detecting a change in graphical characteristic of a portlet indicating user interaction, opening a portlet instance including a media player for playing media and detecting play, stop or pause of the media and detecting a user interaction with a portlet instance by the user selection of one of multiple selectable options within a portlet instance, and user selection of a selectable option to store usage of a portlet instance or the portal page.

One or more instances of the portal summary controller store usage metadata at different times across multiple portal pages opened by multiple separate users. The portal summary controller accesses one or more portal status databases storing usage metadata to dynamically create a summary portal page displaying a separate instance of the at least one portlet application for at least one of the different times specified according to the usage metadata for at least a selection of the multiple users, such that a user may select to view a summary portal page summarizing portlet usage by different users.

The portal summary controller stores files specifying the created summary portal page. An interface is provided for a user to select to open the stored file for the summary portal page. Responsive to the user selecting to open the stored file for the summary portal page, the portal summary controller dynamically generates the summary portal page displaying the separate instance of the at least one portlet application for at least one of each of the plurality of different times specified according to the separate usage metadata stored at each of the plurality of different times.

In addition, the portal summary controller facilitates a graphical user interface for a user to select to save the summary portal page in association with one of multiple calendaring events. Responsive to a user selection of at least one of the calendaring events, the portlet specifications of the summary portal page are stored in associated with the at least one particular calendar event, such that a user viewing the at least one particular calendar event may select, from the at least one calendar event to view the stored summary portal page.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 is a block diagram illustrating one example of layers of a portal for supporting portlets and a portal summary controller for monitoring portal usage, storing portal usage responsive to user generated and automated trigger events, and creating a portal page including a configurable summary of the monitored portal usage of at least one user;

FIG. 2 is a block diagram depicting one example of a network environment for supporting network based portals in which the present invention may be implemented;

FIG. 3 is a block diagram illustrating one embodiment of a computer system in which the present invention may be implemented;

FIG. 11 is a high level logic flowchart depicting a program and process for recording portal usage;

FIG. 12 is a high level logic flowchart illustrating a program and process for generating a summary portal page;

FIG. 13 is a high level logic flowchart depicting a program and process for generating a recording trigger event responsive to highlighting a portal page to reflect user interaction with a portlet in the portal page; and FIG. 14 is a high level logic flowchart depicting a program and process for specifying a summary portal page.

DETAILED DESCRIPTION OF THE PREFERRED EMBODIMENT

Figure 4:
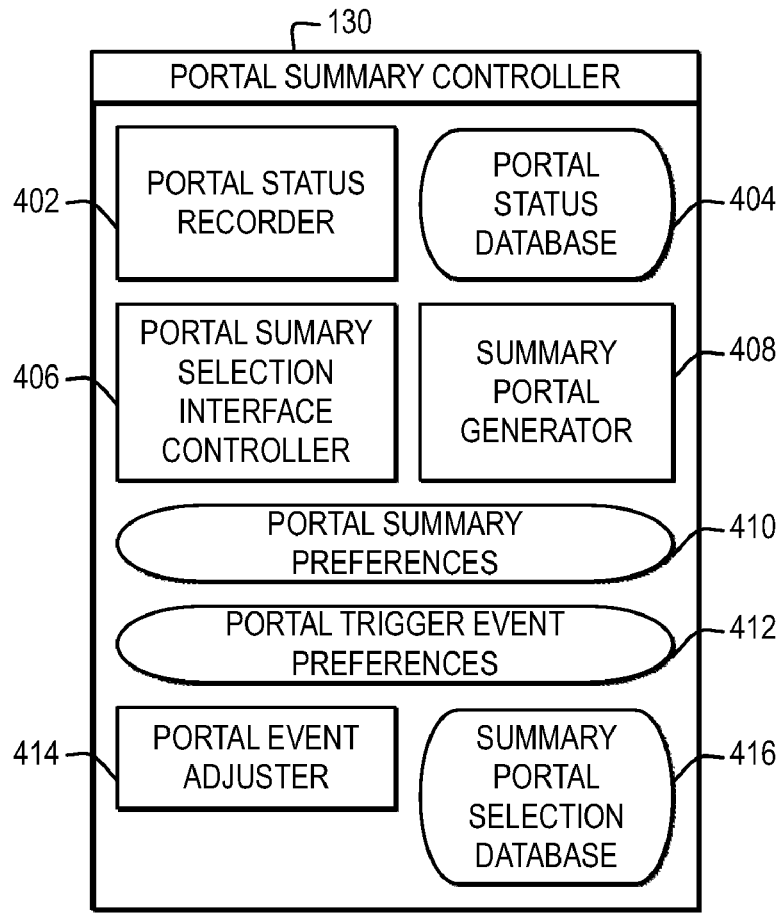
FIG. 4 is a block diagram depicting examples of components of a portal summary controller.

Referring now to FIG. 1, a block diagram illustrates one example of layers of a portal for supporting portlets and a portal summary controller for monitoring portal usage, storing portal usage responsive to user generated and automated trigger events, and creating a portal page including a configurable summary of the monitored portal usage of at least one user. It will be understood that the layers displayed may include additional or alternate layers for implementing the functions described or for implementing additional or alternate functions. In addition, it will be understood that the layers displayed may be distributed across a single computing system or multiple computing systems communicatively connected temporarily or permanently across a network or other connection medium.

In the example, portal layers 100 include a portal application layer 112. Portal application layer 112 includes at least one web application or represents at least one web service for aggregating different applications and controlling a presentation layer for the aggregated applications in the form of a portal page. In particular, in the example, each of portlets 104, 106, and 108 within a portlet layer 102 represent applications which portal application layer 112 may aggregate and control the presentation of instances of the aggregated portlets in a single portal page. In one example, portlets 104, 106, and 108 generate dynamic content called fragments, which are pieces of markup language, such as Hypertext Markup Language (HTML), extensible markup language (XML), or voice XML. The fragments may include data for display or other types of output including, but not limited to, text, graphics, audio, and video. Portal application layer 112 controls presentation of the fragments according to the positioning of the associated portlet instances within the portal page.

In addition, portal application layer 112 facilitates personalization of portal pages. For example, portal application layer 112 facilitates user selection of which portlet instances, such as instances of portlets 104, 106, and 108, to place within a portal page and facilitates user placement of the portlet instances at specific positions within the portal page. In addition, portal application 112 may control a customized appearance of the portal page and the portlet instances displayed within the portal page.

Further, portal application layer 112 may provide for authentication of a user to access the aggregated applications in a portal page through a single authentication process. Once portal application layer 112 authenticates a user, portal application 112 may handle authentication of the user as required by other systems and other layers.

In addition, portal application layer 112 interfaces with a network layer 114 which enables communication with and accesses data from one or more data sources, such as data sources 122, 124, and 126, in a data sources layer 120. In addition, it is important to note that a container layer 110 or portlet layer 102 may interface directly with network layer 114 to access data sources layer 120.

Portlets 104, 106, and 108 are individual web applications or components, instances of which are made accessible to users via a portal page supported by portal application layer 112. In one example, a single portlet, such as any one of portlets 104, 106, and 108, dynamically generates a fragment of the markup that a user views in a portal page which includes one or more instances of the portlet.

Container layer 110 may provide the runtime environment to portlets 104, 106, and 108. For example, users make requests from portlet instances displayed in a portal page and portal application layer 112 forwards the requests to container layer 110. Container layer 110 then distributes the request to the appropriate portlet. In addition, for example, once the portlet dynamically generates the content fragment for the portlet, container layer 110 sends the fragment to portal application layer 112 for display within a portal page. Further, container layer 110 may store portlet preferences for a user and provide additional functions for supporting customized portlet access by a user. It is important to note that while container layer 110 and portlet layer 102 are illustrated as separate layers, the layers may only be virtually represented as separate layers and physically may be part of a same component. In addition, it is important to note that container layer 110 may provide a runtime environment and support for components other than portlets, such as servlets.

In one example, portal layers 100 may include one or more layers written to or implemented under standards which facilitate reusability across multiple types of enterprise systems and other computer systems provided by one or more vendors or developers. In one example, portal application layer 112 may implement a Java 2 Enterprise Edition (J2EE) (Java is a registered trademark of Sun Microsystems Inc.) complaint portal application that is able to run atop one or more different operating systems and process requests from multiple client systems in an enterprise network of computer systems. Portal application layer 112 may call container layer 110 through a container application programming interface (API) to which container layer 110 is specified, where the container API may be reusable across multiple J2EE compliant portal applications or portal applications compliant with other standards. Container layer 110 may call portlets in portlet layer 102 through a portlet API, such as the portlet API standardized according to the Java Portlet Specification. One or more portlets within portlet layer 102 may be created according to the Java Portlet API or other specifications designed for reusability across platforms. In addition, it is important to note that portal application layer 112 may support portal applications written to additional, alternate, or different specifications which run atop an operating system, container layer 110 may support multiple containers written to additional, alternate, or different specifications which portal application layer 112 calls through different container APIs, and portlet layer 102 may support portlets written to additional, alternate, or different portlet standards which container 110 calls through different portlet APIs.

In the example, portal application layer 112 interfaces with a network layer 114 which may include one or more network architecture layers for supporting network requests from and responses to portal application layer 112, container layer 110 and portlet layer 102. In particular, in the example, network layer 114 interfaces with a data source layer 120 that includes one or more data sources illustrated as data sources 122, 124, and 126. Data sources 122, 124, and 126 may represent server systems, which store data, databases, and other data storage mediums, which are accessible via network layer 114.

In one example, portlets 104, 106, and 108 are database driven portlets and the database data that drives portlets 104, 106, and 108 is accessed from data sources layer 120. As database driven portlets, portlets 104, 106, and 108 support at least one data option available for access from at least one of data sources 122, 124, and 126. Container layer 110 may receive changes to the data option selected within the portal page from portal application layer 112, store the current data option preference and pass the currently selected data option to the appropriate one of portlets 104, 106, and 108. Portlets 104, 106, and 108 request data from data source layer 120, such as from one of data sources 122, 124, and 126, via network layer 114. Portlets 104, 106, and 108 receive the data accessed from at least one of data sources 122, 124, and 126 and generate dynamic content called fragments, which are pieces of markup language, such as Hypertext Markup Language (HTML), extensible markup language (XML), or voice XML, from the transferred data. In addition, or alternatively, data sources 122, 124, and 126 may generate and pass dynamic content to requesting portlets 104, 106, and 108. Portal application layer 112 controls generation of a portal page aggregating the fragments dynamically generated or received by portlets 104, 106, and 108.

It is important to note that multiple portlets, such as portlets 104 and 106 may represent a same database driven application, where each of portlets 104 and 106 is set to access a different data option and represents a different instance of the database driven application specified for a portal page. A same data source within data source layer 120 may maintain the data associated with multiple data options of a portlet or different data sources may separately maintain the data associated with each of the multiple data options.

According to an advantage of the present invention, layers 100 may include a portal summary controller 130. In the example, portal application layer 112 includes portal summary controller 130. Functions of portal application layer 112 may also be implemented within container layer 110 and portlet layer 102 or may access data from container layer 110 and portlet layer 102. In other embodiments, additional, alternate, or multiple layers may implement portal summary controller 130.

Portal summary controller 130 monitors usage of one or more portal pages created by portal application layer 112 and stores the usage with a timestamp and other available information. Portal page usage may include, but is not limited to, which portlets are currently placed within a the portal page and the states of the portlets including, but not limited to, which data options are selected in the database driven portlets and what content is dynamically generated by each portlet and displayed within the instance of the portlet within the portal page. In addition, portal page usage may include session metadata including, but not limited to, the event that triggered capturing the states of portlets, user interaction with a portlet instance, the result of user interaction with a portlet instance, the timestamp when the states the portlet instances are captured, and addition or removal of a portlet instance from a portal page. Portal summary controller 130 detects events that trigger the capturing of the states of portlets from user generated events and from automated events. Subsequent to monitoring and storing portal usage, portal summary controller 130 provides a configurable summary of the stored portal usage in a summary portal page displaying portlet instances specified according to the stored portal usage for at least one user.

With reference now to FIG. 2, a block diagram illustrates one example a network environment for supporting network based portals in which the present invention may be implemented. It is important to note that network environment 200 is illustrative of one type of network environment which may support one or more layers of portal layers 100, however, the method, system, and program described with reference to portal layers 100 may be implemented in other network environments. In addition, it is important to note that the distribution of systems within network environment 200 is illustrative of a distribution of systems, however, other distributions of systems within a network environment may be implemented.

As illustrated, multiple systems within network environment 200 may be communicatively connected via network 202, which is the medium used to provide communications links between various devices and computer systems communicatively connected. Network 202 may include permanent connections such as wire or fiber optics cables and temporary connections made through telephone connections and wireless transmission connections, for example. Network 202 may represent one or more of packet-switching based networks and telephony based networks, local area and wide area networks, public and private networks.

When represented within network layer 114, network 202 may represent one or more layers of a network protocol stack that includes one or more of a physical layer, a link layer, a network layer, a transport layer, a presentation layer, and an application layer. Network layer 114 may implement, for communications between systems across network 202, multiple types of network protocol stacks. For example, network layer 114 may implement one or more of the Transmission Control Protocol/Internet Protocol (TCP/IP) protocol stack or an Open Systems Interconnection (OSI) protocol stack. In addition, for example, network 202 may represent the worldwide collection of networks and gateways that use the TCP/IP suite of protocols to communicate with one another.

Network environment 200 may implement multiple types of network architectures. In one example, network environment 200 may be implemented using a client/server architecture, where computing systems requesting data or processes are referred to as clients and computing systems processing data requests and processes are referred to as servers. In another example, network environment 200 may be implemented in a peer-to-peer network architecture. In yet another example, network environment 200 may be implemented in a grid architecture. It will be understood that other types of network architectures and combinations of network architectures may be implemented.

In the embodiment, as illustrated, client systems 210 and 212 are communicatively connected via network 202 to one or more of a portal server system 218 and data server systems 214 and 216. Client systems 210 and 212 are representative of one or more client systems at which portal pages are accessed and displayed through output interfaces and data server systems 214 and 216 are representative of servers which serve as data sources for providing data to portlets. In additional or alternate embodiments, additional or alternate client systems and data server systems may be implemented.

In one example, client systems 210 and 212 may implement portal application layer 112, container layer 110, and portlet layer 102 and access data for portlets from one of data server systems 214 and 216. Portal summary controller 130 may store the current contents of portlets locally at client system 210 or 212 and generate a summary portal page from locally stored portal usage.

In another example, a portal server system 218 may implement portal application layer 112, container layer 110 and portlet layer 102 and a local browser on client system 210 or 212 controls display of a portal page created by portal server system 218 and passes user interaction within the portal page to portal server system 218. Portal summary controller 130 may store portal usage at portal server system 218 and generate a summary portal page for display at one of client systems 210 or 212 with portlets specified from the portal usage stored by portal server system 218.

In yet another example, each of client system 210, client system 212, and portal server system 218 may implement one or more of portal application layer 112, container layer 110 and portlet layer 102. In addition, as previously noted, client system 210 and client system 212 may run additional application software, such as a browser or other application in which portal pages may be viewed and which returns user interactions with portal pages to portal application layer 112.

In addition, in other examples, portal server system 218 may represent an enterprise server system for providing client systems, such as client systems 210 and 212, access to network 202. Portal server system 218 may implement Websphere (Websphere is a registered trademark of International Business Machines Corporation) applications or other enterprise server applications for controlling portal page delivery, portal summary page delivery, and network access for multiple client systems.

Referring now to FIG. 3, a block diagram depicts one embodiment of a computer system in which the present invention may be implemented. The controllers and systems of the present invention may be executed in a variety of systems, including a variety of computing systems, such as computer system 300, communicatively connected to a network, such as network 202.

Computer system 300 includes a bus 322 or other communication device for communicating information within computer system 300, and at least one processing device such as processor 312, coupled to bus 322 for processing information. Bus 322 includes low-latency and higher latency paths that are connected by bridges and adapters and controlled within computer system 300 by multiple bus controllers. When implemented as a server, computer system 300 may include multiple processors designed to improve network servicing power. Where multiple processors share bus 322, an additional controller (not depicted) for managing bus access and locks may be implemented.

Processor 312 may be a general-purpose processor such as IBM's PowerPC™ processor that, during normal operation, processes data under the control of an operating system 360, application software 370, middleware (not depicted), and other code accessible from a dynamic storage device such as random access memory (RAM) 314, a static storage device such as Read Only Memory (ROM) 316, a data storage device, such as mass storage device 318, or other data storage medium. Application software 370 may include software for one or more of portal application layer 112, container layer 110 and portlet layer 102, described in FIG. 1. In addition, application software 370 may include software for controlling a data source, such as a database, implementing data source layer 120. Further, application software 370 or middleware may implement one or more types of enterprise software, such as Websphere (Websphere is a registered trademark of International Business Machines Corporation) software, such as for running a Websphere application server.

In one embodiment, the operations performed by processor 312 may control monitoring portal usage, recording and storing the monitored portal usage, and subsequently, creating a summary portal page configurable to display all or a portion of the stored portal usage of at least one user, as described in the operations of the flowcharts of FIGS. 8-10 and other operations described herein. Operations performed by processor 312 may be requested by operating system 360, application software 370, middleware or other code or the steps of the present invention might be performed by specific hardware components that contain hardwired logic for performing the steps, or by any combination of programmed computer components and custom hardware components.

The present invention may be provided as a computer program product, included on a computer or machine-readable medium having stored thereon the executable instructions of a computer-readable program that when executed on computer system 300 cause computer system 300 to perform a process according to the present invention. The terms "computer-readable medium" or "machine-readable medium" as used herein includes any medium that participates in providing instructions to processor 312 or other components of computer system 300 for execution. Such a medium may take many forms including, but not limited to, storage type media, such as non-volatile media and volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 300 can read and which is suitable for storing instructions. In the present embodiment, an example of a non-volatile medium is mass storage device 318, which as depicted is an internal component of computer system 300, but will be understood to also be provided by an external device. Volatile media include dynamic memory such as RAM 314. Transmission media include coaxial cables, copper wire or fiber optics, including the wires that comprise bus 322. Transmission media can also take the form of acoustic or light waves, such as those generated during radio frequency or infrared data communications.

Moreover, the present invention may be downloaded or distributed as a computer program product, wherein the computer-readable program instructions may be transmitted from a remote computer such as a server 340 to requesting computer system 300 by way of data signals embodied in a carrier wave or other propagation medium via network 202 to a network link 334 (e.g. a modem or network connection) to a communications interface 332 coupled to bus 322. In one example, where processor 312 includes multiple processor elements, then a processing task distributed among the processor elements, whether locally or via a network, may represent a computer program product, where the processing task includes program instructions for performing a process or program instructions for accessing Java (Java is a registered trademark of Sun Microsystems, Inc.) objects or other executables for performing a process. Communications interface 332 provides a two-way data communications coupling to network link 334 that may be connected, for example, to a local area network (LAN), wide area network (WAN), or directly to an Internet Service Provider (ISP). In particular, network link 334 may provide wired and/or wireless network communications to one or more networks, such as network 202. Further, although not depicted, communication interface 332 may include software, such as device drivers, hardware, such as adapters, and other controllers that enable communication. When implemented as a server, computer system 300 may include multiple communication interfaces accessible via multiple peripheral component interconnect (PCI) bus bridges connected to an input/output controller, for example. In this manner, computer system 300 allows connections to multiple clients via multiple separate ports and each port may also support multiple connections to multiple clients.

Network link 334 and network 202 both use electrical, electromagnetic, or optical signals that carry digital data streams. The signals through the various networks and the signals on network link 334 and through communication interface 332, which carry the digital data to and from computer system 300, may be forms of carrier waves transporting the information.

In addition, computer system 300 may include multiple peripheral components that facilitate input and output. These peripheral components are connected to multiple controllers, adapters, and expansion slots, such as input/output (I/O) interface 326, coupled to one of the multiple levels of bus 322. Input device 324 may include, for example, a microphone, a video capture device, a body scanning system, a keyboard, a mouse, or other input peripheral device, communicatively enabled on bus 322 via I/O interface 326 controlling inputs. In addition, an output device 320 communicatively enabled on bus 322 via I/O interface 326 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 3 may vary. Furthermore, those of ordinary skill in the art will appreciate that the depicted example is not meant to imply architectural limitations with respect to the present invention. For example, computer system 300 may also be a tablet computer, laptop computer, or telephone device.

With reference now to FIG. 4, a block diagram illustrates examples of components of a portal summary controller. It will be understood that in additional or alternate embodiments, the portal summary controller may include additional or alternate components.

In the example, portal summary controller 130 includes a portal status recorder 402. Portal status recorder 402 monitors the usage of one or more portal pages and records and stores portal usage in a portal status database 404. As previously noted, portal usage may include, but is not limited to, which portlet instances are open within a portal page and for all portlets or individual portlets, the state of the portlets, including, but not limited to the selected data options for open database driven portlets and the dynamically generated content of portlet instances within a portal page. In addition, portal usage may include, but is not limited to, the trigger event causing storage of any portal usage, any user interaction with a portal page, the result of any user interaction with a portal page, and timestamps when the portal usage is recorded, based on a clock, and other time based information within a portlet instance, such as a media player time. In addition, portal usage may include additional or alternate types of information. It is important to note that dynamically generated content within a portlet instance may include, but is not limited to, text, graphics, audio, video and streaming multimedia content.

In one example, portal trigger event preferences 412 specify a preference to trigger adjustment to the graphical characteristics of individual portlet instances or a portal page, to indicate when usage of individual portlet instances or the portal page is recorded by portal status recorder 402. As portal status recorder 402 records and stores portal usage records within portal status database 404, based on portal trigger event preferences 412, portal event adjuster 414 detects the recording and, to graphically indicate the recording, adjusts a graphical characteristic or other output characteristic of individual portlet instances within a portal page or may adjust a graphical characteristic or other output characteristic within the portal page itself. For example, each time portal status recorder 402 records the portal usage for a portal page, portal event adjuster 414 may add a time stamp to a portion of the portal page indicating when the portal usage was recorded and stored for the portal page. In another example, each time portal status recorder 402 records the portal usage for a portal page, portal event adjuster 414 may temporarily adjust a graphical attribute or characteristic of the portal page or an individual portlet instance within the portal page, such as by adding shading or adjusting a coloring of a portal page or individual portlet instance within the portal page. In yet another example, where portal status recorder 402 monitors portal usage within multiple portal pages, portal event adjuster 414 may simultaneously update a graphical characteristic of each of the monitored portal pages or graphically distinguish a selection of recorded portal pages from at least one portal page for which portal usage is not recorded.

In particular, when a developer programs a portlet application, the developer may specify which portions of an instance of the portlet application should be graphically adjusted to indicate when usage of the portlet is recorded and may specify the type of graphical adjustment to apply to the instance of the portlet application when usage of the portlet is recorded. In addition, portal trigger event preferences 412 may specify the portions and types of graphical adjustments to apply to portlet instances to indicate when usage of portlet instances is recorded.

In monitoring usage of one or more portal pages accessed by one or more users, portal status recorder 402 may determine when to record and store portal usage within portal status database 404 based on a user generated trigger event of selecting, within a portlet instance or within a portal page, a selectable option to direct portal status recorder 402 to record and store the current usage for a particular portlet instance or the portal page. In one example, a developer may specify for instances of a portlet application to include a "save" button, which when selected, generates a trigger event for portal status recorder 402 to record and store the current usage of the instance of the portlet application. In another example, a portal application may include a "save" button within each portal page, which when selected, generates a trigger event for portal status recorder 402 to record and store the current usage of the portlet instances within the portal page.

In addition, in monitoring usage of one or more portal pages accessed by one or more users, portal status recorder 402 may determine when to record and store portal usage within portal status database 404 based on different user interactions which are specified in portal trigger event preferences 412 to generate trigger events for triggering portal status recorder 402 to record portal usage. In one example, portal trigger event preferences 412 may specify a preference for a user interaction of opening a portal page to generate a trigger event for triggering portal status recorder 402 to record portal usage when the portal page is opened. In another example, portal trigger event preferences 412 may specify a preference for a user interaction of adjusting a data option selection within a portlet instance to generate a trigger event for triggering portal status recorder 402 to record usage of the portlet instance. In yet another example, portal trigger event preferences 412 may specify a preference for user interactions with specific graphical options, such as buttons, within a portlet instance to generate a trigger event. For example, portal trigger event preferences 412 may specify a preference to trigger portal status recorder 402 when a user interaction with one of the "play", "stop" or "pause" buttons within a media based portlet instance is detected.

Further, in monitoring usage of one or more portal pages accessed by one or more users, portal status recorder 402 may determine when to record and store portal usage within portal status database 404 based on different automated events which are specified in portal trigger event preferences 412 to generate trigger events for triggering portal status recorder 402 to record portal usage. In one example, a portal event adjuster 414 detects user interactions with portlet instances in a portal page and, responsive to the user interactions, controls graphical adjustments to each portlet instance a user interacts with. In one example, the graphical adjustment includes graphically highlighting a portlet instance to indicate that the user has interacted with the portlet instance. Portal trigger event preferences 412 may include a preference that any highlighting of a portlet instance indicative of user interaction generates a trigger event to trigger portal status recorder 402 to record the usage of the portlet. It is important to note that portal event adjuster 414 applies a first set of graphical adjustments to distinguish those portlets for which usage is recorded and a second set of graphical adjustments to distinguish those portlets with which a user has interacted during a session. In addition, it is important to note that a portal page may include a selectable option that triggers portal event adjuster 414 to remove the highlighting and may also trigger portal event adjuster 414 to direct returning the portlet instances to a previous state prior to the highlighting.

In another example of an automated event specified in portal trigger event preferences 412 to generate trigger events for triggering portal status recorder 402 to record portal usage, each update to the dynamically generated content for a particular data option may generate a trigger event. In one example, portal status recorder 402 monitors when portlet instances receive updated dynamically generated content separate from a user changing a data option to select different dynamically generated content.

In addition, in monitoring usage of one or more portal pages accessed by one or more users, portal status recorder 402 may determine when to record and store portal usage within portal status database 404 at different time periods which are specified in portal trigger event preferences 412 to generate trigger events for triggering portal status recorder 402 to record portal usage. In one example, portal trigger event preferences 412 specify a frequency, such as hourly, daily, weekly, or other time frequency, at which to generate a trigger event to trigger portal status recorder 402 to record portal usage for at least one portal page. In another example, portal trigger event preferences 412 may be tied to a calendaring application that specifies a frequency at which to generate a trigger event based on calendaring events.

Further, in another example, in monitoring usage of one or more portal pages accessed by one or more users, portal status recorder 402 may determine when to record and store portal usage within portal status database 404 based on the actual content of dynamically generated content or content summaries of a portlet instances. In particular, portal trigger event preferences 412 may specify types of actual content which, when detected within the dynamically generated content or summary of content of a portlet instance, generates a trigger event. In one example, in dynamically generating content from current data for a selected data option, a portlet application may also generate a summary of the current data which is scannable by portal status recorder 402 to determine the actual content of a portlet instance and detect whether portal trigger event preferences 412 specify any of the actual content as generating a trigger event. In another example, portal status recorder 402 may scan the HTML fragment or a snapshot of the dynamically generated content to determine the actual content of a portlet instance and detect whether portal trigger event preferences 412 specify any of the actual content as generating a trigger event.

Portal summary controller 130 also includes a portal summary selection interface controller 406. In one example, portal summary selection interface controller 406 provides an interface with a list or other selectable representation of one or more records representing portal usage recorded in portal status database 404. A user, selecting from the list, may customize or configure those records of portal usage for summary portal generator 408 to include in a summary portal page. In another example, portal summary selection interface controller 406 may include selectable options within an interface for a user to select a particular portlet and select a time period over which to display all the portal usage for the particular portlet stored in portal status database 404 within a summary portal page generated by summary portal generator 408. Further, in another example, portal summary selection interface controller 406 may include selectable options within an interface for a user to select to automatically direct summary portal generator 408 to create a portal page for all or a selection of portal usage contemporaneously with the recording of the portal usage within portal status database 404.

In addition, portal summary selection interface controller 406 may provide an interface for a user to select to include the portal usage by more than one user within a portal summary page. For example, a portal summary selection interface may include selectable options for individual users, groups of users, or types of users. Where a user selects to view portal usage associated with multiple users, portal summary selection interface controller 406 may include selectable options of types of portal usage to view. For example, a user may select to view only the financial portlet usage by multiple users. In another example, a user may select to view only the usage by multiple users that is the same usage of the same portlets and the same data option selections. Further, in another example, a user may select to view the summary portal pages generated for multiple other users.

In addition to a user directly selecting which selection of portal usage stored in portal status database 404 to include in a summary portal page, portal summary preferences 410 may specify preferences for specifying the selection of portal usage stored in portal status database 404 for summary portal generator 408 to include in a summary portal page. In one example, portal summary preferences 410 may indicate a preference to automatically generate a summary portal page for each record of portal usage recorded in portal status database 404. In another example, portal summary preferences 410 may indicate a preference to automatically generate a summary portal page on the morning of each business quarter including a separate portlet instance of a particular portlet application for each of the previously recorded business quarters with each portlet instance displaying the content stored for the portlet application at the end of the current quarter or one of the previous quarters.

In creating a summary portal page, summary portal generator 408 may create a portal page which may include at least one portlet instance of at least one portlet application which functions as if placed on a normal portal page with the data options for database driven portlets specified according to the data options for the portlets specified at a previous point in time as accessed from portal status database 404. Based on the previously specified data options, the portlet instance in a summary portal page displays dynamically generated content for the portlet based on the current data for the previously selected data option.

In addition, in creating a summary portal page, summary portal generator 408 may create a summary portal page in which portlet instances may function as if placed on a normal portal page, however the content of the portlet instance is specified with the content previously displayed within the portlet instance of a same portlet application at a previous point in time as accessed from portal status database 404. In this example, the summary portal page may include multiple portlet instances each specified with content accessed from portal status database 404 as recorded at a same point in time or different points in time.

Further, in creating a summary portal page, summary portal generator 408 may create a summary portal page which includes portlet instances for those portlet applications recorded as placed within a portal page over a particular time period within portal status database 404, with a default data option selected. In this example, in addition to allowing a user to specify the portlet instances open within a portal page, the user may store time based recordings of which portlet instances were open within a portal page at different points in time and access a summary portal page with the portlet instances open at one of the different points in time as recorded in portal status database 404.

Moreover, in creating a summary portal page, summary portal generator 408 may direct a portal application within portal application layer 112 to create the summary portal page with a selection of one or more portlets and one or more of a selection of data options set for the portlets and a selection of stored content to display in the portlets. In addition or alternatively, summary portal generator 408 may create a portal page separately from the portal application within portal application layer 112 with the selection of one or more portlet instances and one or more of a selection of data options set for the portlet instances and a selection of stored content from portal summary preferences 410 to display in the portlet instances.

In one example, summary portal generator 408 creates a summary portal page within a separate window. In another example, summary portal generator 408 creates the summary portal page within an interface, which adds a new tab to support a new portal page, and summary portal generator 408 places the summary portal page within the tab.

Further, in creating a summary portal page, summary portal generator 408 may graphically distinguish the portions of the content displayed within the summary portal page which are based on records from portal status database 404 from the portions of the content displayed within the summary portal page which are based on current data accesses. In addition, as a user interacts with the summary portal page, the user may change data option selections within one or more portal instances and summary portal generator 408 specifies user selected changes according to the same graphical characteristic used to distinguish current data accesses. For example, portions of the content displayed within the summary portal page based on records from portal status database 404 may be graphically distinguished with a distinguishable color, texture, hue, or other graphical indicator which facilitates visual distinction of content based on records from portal status database 404 from the other content displayed within the summary portal page.

In addition, in creating a summary portal page, summary portal generator 408 may add the highlighting or other graphical characteristics of a portlet instance specified in a portlet usage record to the summary portal page. For example, if a portal record includes highlighting specified in response to user interaction with the portlet instance in a portal page, summary portal generator 408 applies the highlighting to the portlet instance in the summary portal page to distinguish the portlet instance within the summary portal page which was previously interacted with by a user.

Further, in creating a summary portal page, summary portal generator 408 may detect whether a portlet instance placed in a summary portal page plays multimedia data, such as a movie or a song, and triggers the portlet instance to begin play of the multimedia data based on portal usage including a timestamp of the recorded media play time. In one example, the portlet instance receives the timestamp and starts play of the multimedia from the time stamped time or from an index point for a chapter closest to the timestamp time.

It is important to note that portal status database 404 may be stored at a client system, such as one of client systems 210 or 212, or at a portal server system, such as portal server system 218. In the example where portal usage is stored at a client system, portal status database 404 may represent a database within memory or may represent data stored with cache. In addition, separate storage systems for storing portal usage may be accessible to client systems or portal server systems via network 202.

In one example, where portal usage is stored at a client system, portal status recorder 402 may store data points within portal status database 404 and a rich client portal application running at the client system renders portlets locally from the data points for output within a summary portal page managed by summary portal generator 408. In addition, in the example where portal usage is stored at a client system, portal status recorder 402 may store HTML fragments, as previously described, within portal status database 404 and a rich client portal application renders portlets locally from the HTML fragments by running a file server portlet that allows display of HTML content. In yet another example, where portal usage is stored at a client system, portal status recorder 402 may capture and store static snapshot images of a portlet instance and summary portal generator 408 generates HTML from the snapshot for rendering through a rich client portal application running a file server portlet that allows display of HTML content.

In the example, where portal usage is stored in portal status database 404 at a portal server system, portal status recorder 402 may record into portal status database 404 data points, HTML, or static snapshot images, as described with reference to locally storing portal usage. Portal summary preferences 410 or other preferences within one or more of the layers of portal layers 100 are set to point to portal status database 404 at the portal server system. The portal server system renders the content for display in the portlet instances in a summary portal page from the stored data points, HTML or static snapshot images.

In addition, it is important to note that while the invention is described with reference to summary portal generator 408 accessing portal status database 404 to generate summary portal pages, other controllers or functions may access portal status database 404. For example, when a user is offline or not able to access a data server system for a portlet, portlet applications may access previously accessed and stored content from portal status database 404, and dynamically generate content for display within portlet instances while offline or not able to access a data server system for a portlet.

Summary portal generator 408 may store the specifications of a generated summary portal page in records within a summary portal selection database 416. Summary portal generator 408 may automatically store specifications of a generated summary portal page, including portal usage, or a user may select to store the specifications of a generated summary portal page in summary portal selection database 416.

In one example, portal summary selection interface controller 406 may also allow a user to select to open previously generated summary portal pages from summary portal selection database 416. In another example, a portal application layer may support a pull down menu or other interface through which a user may select to open a previously generated summary portal page from summary portal selection database 416. It is important to note that summary portal generator 408 may generate a summary portal page and store the generated summary portal page in summary portal selection database 416, but not display the summary portal page until a user selects to open the summary portal page from summary portal selection database 416.

In addition, portal summary selection interface controller 406 may facilitate a user associating a generated summary portal page from summary portal selection database or stored portal usage for an individual portlet from portal status database 404 with a calendar event, a conference session or other events. In addition, each of a calendaring application and a conference session application may include plug-in components for facilitating user association of a generated summary portal page or portlet usage with events from selectable options within the calendaring application or conference session application.

Figure 5:
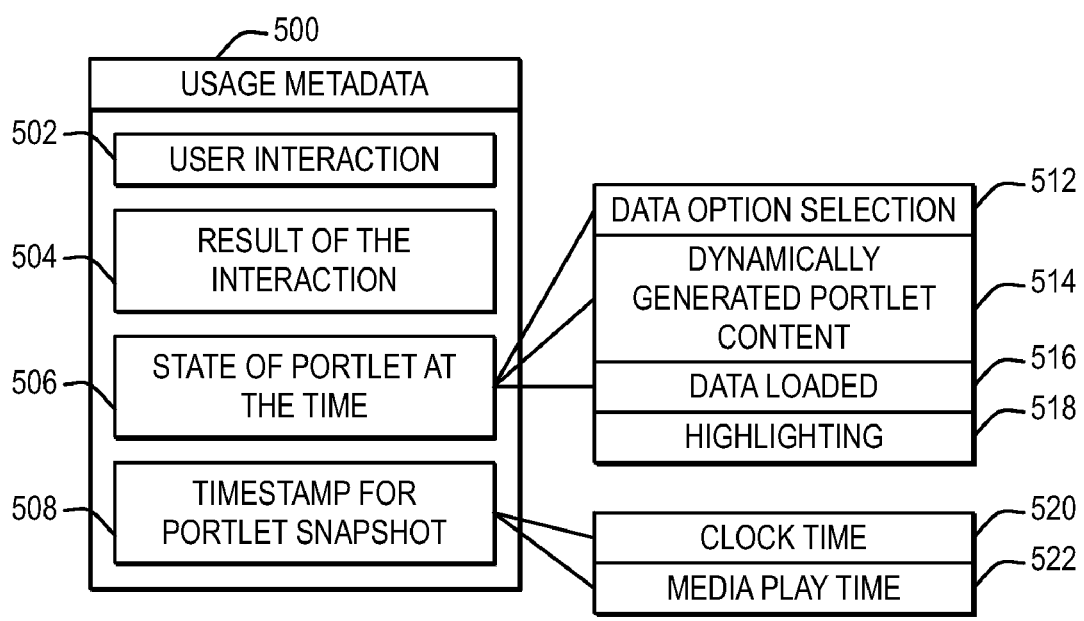
FIG. 5 is a block diagram illustrating examples of portal usage metadata for storage in portal usage records within the portal status database.

With reference now to FIG. 5, a block diagram illustrates examples of portal usage metadata for storage in portal usage records within the portal status database. It will be understood that usage metadata 500 may include additional or alternate types of data from the types of data illustrated.

In the example, usage metadata 500 illustrates types of data which can be detected by portal event adjuster 414 to trigger adjustments to a portal page, can be detected by portal status recorder 402 to trigger recording usage metadata 500, and can be stored in portal status database 404 includes detected user interaction 502.

In a first example, usage metadata 500 may include user interaction 502. User interaction 502 may include, but is not limited to, a user selecting to open a portal page, a user selecting a data option within a portlet instance, a user selecting other selectable buttons or options within a portlet instance, and other types of user interaction related to a portal page.

In addition, in the example, usage metadata 500 may include the result of the user interaction 504. Results of user interaction 504 may include, but is not limited to, new dynamically generated content loaded into a portlet, a new portlet instance opened, a portlet instance closed, a function of the portlet instance triggered, and other types of results of user interaction related to a portal page.

Further, in the example, usage metadata 500 may include the state of the portlet at the time 506. The time may represent a current time, a time when recorded by portal status recorder 402, or other time periods. In the example, the state of the portlet at the time 506 may include, for each portlet instance, data such as the data option selection 512, dynamically generated portlet content 514, data loaded 516, and highlighting 518.

In addition, in the example, usage metadata 500 may include a timestamp for the portlet snapshot 508. Timestamp 508 may include multiple types of data including, but not limited to, a clock time 520 when the snapshot of one or more portlets is recorded and a media play time 522 indicating the current play time of media viewed within a particular portlet instance.

Although not depicted, usage metadata 500 may also include additional summary information available for a portlet instance, information about the trigger event that caused storage of usage metadata 500 and other information representative of portal usage as a whole and for portlets individually.

Figure 6:
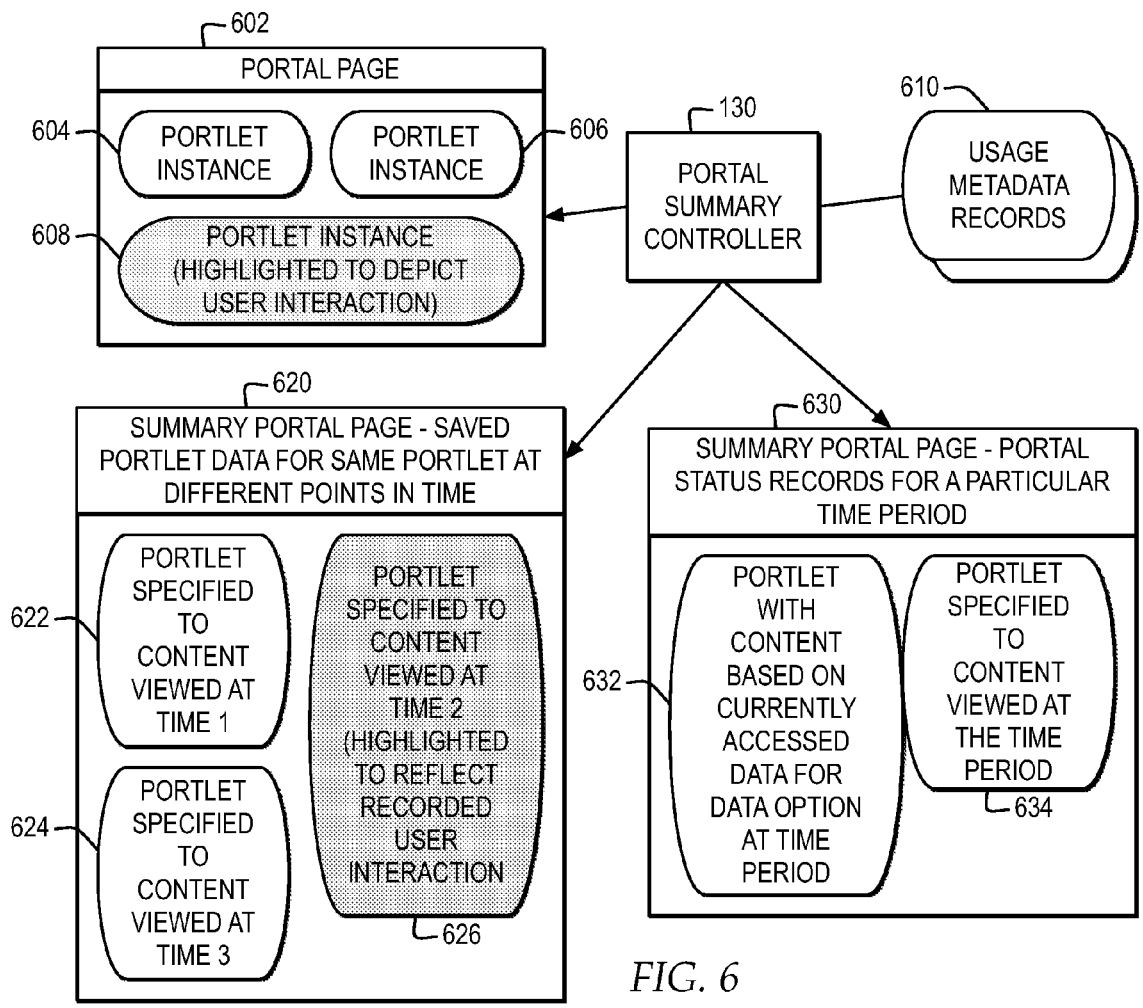
FIG. 6 is a block diagram illustrating examples of portlet instances specified according to recorded portal usage within summary portal pages.

With reference now to FIG. 6, a block diagram illustrates examples of portlet instances specified according to recorded portal usage within summary portal pages. In the example, portal summary controller 130 monitors portal usage of a portal page 602 which includes portlet instances 604, 606, and 608. Portlet instances 604, 606, and 608 may represent instances of a same portlet application or different portlet applications. In addition, at least one of portlet instances 604, 606, and 608 represents an instance of a database driven portlet.

In the example, portal summary controller 130 detects and stores, at one or more points in time, within portal status database 404, portal usage of one or more of the portal instances open within portal page 602 within usage metadata records 610. Usage metadata records 610 may include, for each portlet instance, the portlet content, the selected portlet options, and other types of metadata illustrated in FIG. 5. In particular, an additional type of metadata stored in usage metadata records 610 may include highlighting, such as the highlighting of portlet instance 608, where the highlighting depicts user interaction with the portlet instance. In addition, although not depicted, portal summary controller 130 may detect and store portal usage from other portal pages in portal status database 404.

In one example, portal summary controller 130 generates a portal summary page of the saved portlet content for a same portlet application over multiple points in time. For example, usage metadata records 610 may store the portlet content for a financial portlet each month. Summary portal page 620 includes multiple instances of the financial portlet illustrated by portlet instances 622, 624, and 626. Each of the portlet instances includes the content saved for one of the previous months in the financial portlet instances displayed within portal page 602 or other portal pages. Thus, a user may select to view a summary of multiple instances of a same portlet application with the content displayed for that portlet at different points in time.

In particular, portlet instance 626 represents the portal usage stored for portlet instance 608. Since portlet instance 608 was highlighted to reflect user interaction with the portlet instance at the time when the usage of the portlet was recorded, the summary of usage of portlet instance 608, depicted by portlet instance 626, is also highlighted to reflect the previous user interaction with the portlet instance. As illustrated in summary portal page 620, by recording highlighting or other graphical indictors in usage metadata records 610, summary portal page 620 also includes a summary of the previous user interaction with different portlets.

In another example, portal summary controller 130 generates a portal summary page 630 of the portlets accessed at one or more different times over a particular time period. In the example, portal summary page 630 includes instances of each of the portlets recorded as placed within portal page 620 at a particular point in time. For portlet instance 632, the portlet instance is set to access the content currently available for the data option selected at the particular time period. For portlet instances 634, the portlet instance is set to display the content stored for the portlet at the particular time period. Thus, a user may select to view a summary of instances of portlets placed in a portal page at a particular time and either access current content for the data option selected at the point in time or access the content that was displayed in the portlet at the point in time.

Importantly, portal summary controller 130 generates portal summary pages including only a user designated selection of the stored portal usage of individual portlets from usage metadata records 610. In each of the examples of summary portal page 620 and 630, portal summary controller 130 may also access usage metadata records for different users and may include portal usage by different users within a single summary portal page. In one example, portal summary controller 130 may distinguish the portal usage by different users within a summary portal page through assigning a graphical characteristic to each selection of portal usage represented within a summary portal page that is accessed for a same user.

Figure 7:
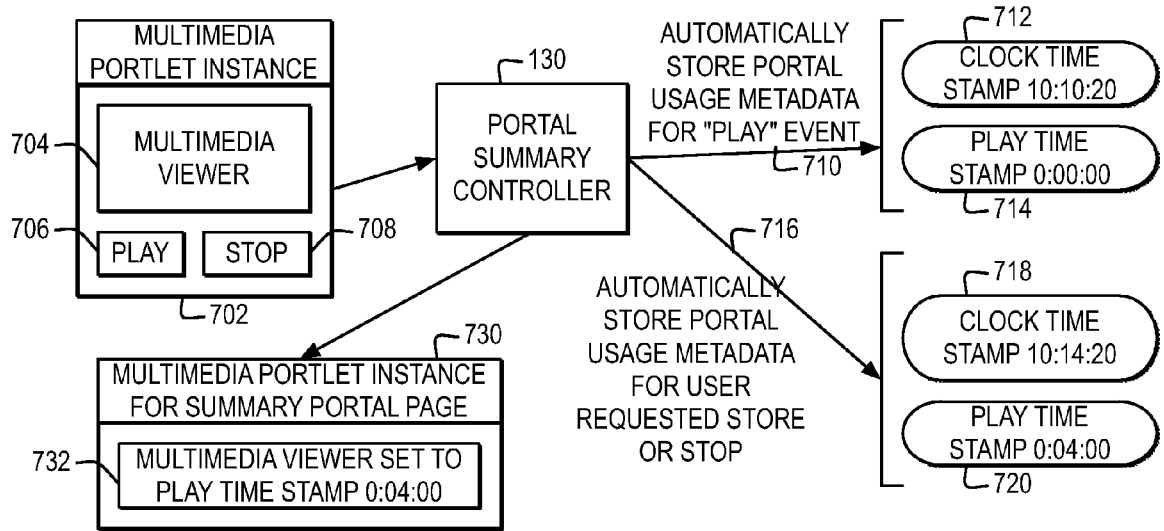
FIG. 7 is a block diagram illustrating one example of usage metadata stored for a multimedia portlet instance.

Referring now to FIG. 7, a block diagram illustrates one example of usage metadata stored for a multimedia portlet instance. In the example, portal summary controller 130 monitors portal usage of a multimedia portlet instance 702 which includes a multimedia viewer 704. Multimedia viewer 704 may enable viewing of one or more formats or protocols of graphic, movie, sound, and other types of multimedia. Multimedia viewer 704 may play streaming audio or video or may play audio or video from a file. In the example, a user may select to play or stop play of the multimedia within multimedia viewer 704 by selecting play button 706 or stop button 708, respectively. In addition, other types of user inputs may trigger playing or stopping play of multimedia within multimedia viewer 704. While in the example multimedia viewer 704 is described with reference to multimedia portlet instance 702, in other embodiments, multimedia viewer 704 may be incorporated within a portlet instance that provides multiple types of data, functions, or options in addition to incorporating a multimedia viewer.

In the example, the portal usage of multimedia portlet instance 702 monitored by portal summary controller 130 includes a current clock time and a play time of the multimedia within multimedia viewer 704. In particular, in the example, as illustrated at reference numeral 710, when a play event is triggered for multimedia viewer 704 to play the multimedia, portal summary controller 130 automatically stores the portal usage, including a clock time stamp 712 and a play time stamp 714. As illustrated, initially, the play time stamp is set to "0:00:00".

As depicted at reference numeral 716, when a user requests to store portal usage, including usage of multimedia portlet instance 702 or a stop event is triggered for multimedia viewer 704 to stop play of the multimedia, portal summary controller 130 automatically stores the portal usage, including a clock time stamp 718 and a play time stamp 720. As illustrated, when the trigger event represented by reference numeral 716 triggers storage of portal usage, the play time stamp has advanced to "0:04:00", a difference of four minutes from play time stamp 714.

As depicted at reference numeral 730, if portal summary controller 130 generates a summary portal page with an instance of the multimedia portlet specified according to portal usage triggered as illustrated at reference numeral 716, then as illustrated at reference numeral 732, the multimedia viewer within the portlet instance is set to start play at "0:04:00" on the time counter for playing the multimedia within the multimedia viewer. In another example, multimedia may include indexing, such as chapter indexing, where the multimedia viewer in the portlet instance within the summary portal page receives play time stamp 720 and sets the multimedia to start play from the index prior to play time stamp 720. In another example, where the multimedia content is streamed through the multimedia portlet instance, the multimedia portlet instance or other application may retrieve a start time and end time from a server streaming the multimedia or other server, where the start time stamp may be saved as portal usage and also applied as an offset to the server provided start time of the streamed multimedia content when next accessed.

Figure 8:
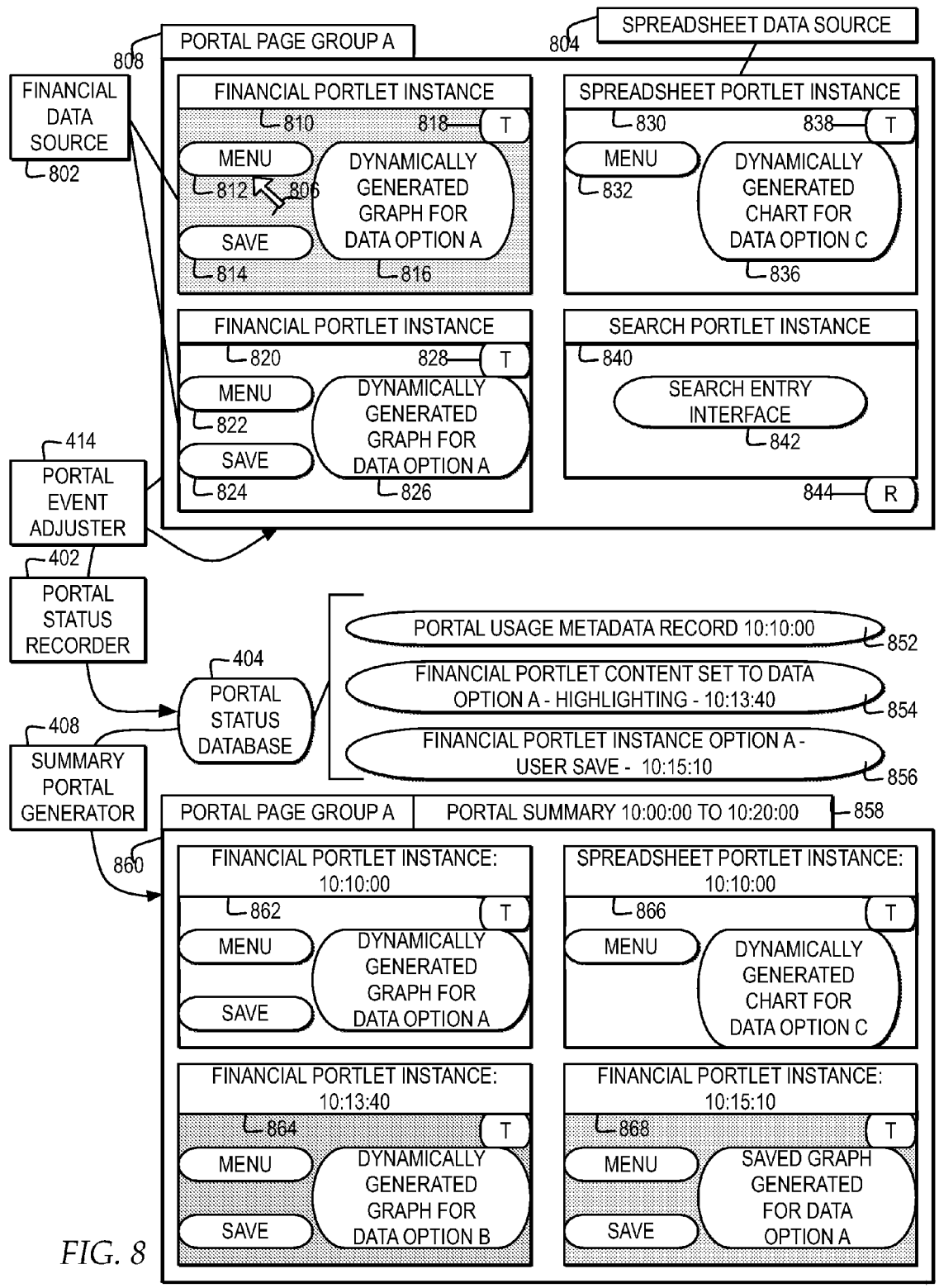
FIG. 8 is a block diagram depicting one example of a portal summary page for portal usage over a particular time period.

Referring now to FIG. 8, a block diagram illustrates one example of a portal summary page for portal usage at different times over a particular time period. In the example, within a first portal page displayed within an interface that facilitates tabbed windows for rendering portal pages, a first "portal page group A" is illustrated as depicted at reference numeral 808. The portal page illustrated for the tab depicted at reference numeral 808 includes financial portlet instances 810 and 820, a spreadsheet portlet instance 830 and a search portlet 840. Each of financial portlet instances 810 and 820 and spreadsheet portlet instance 830 are instances of database driven portlets and include a menu of selectable data options, respectively illustrated at reference numerals 812, 822, and 832. In alternate embodiments, additional or alternate types of selection interfaces from the menu selections may be implemented. For example, data options may be selectable from multiple selectable words or links displayed within a portlet instance.

In the example, those portlet instances which are recordable according to user preferences are marked with a graphical indicator as illustrated by graphical indicators 818, 828, and 838. Portal summary preferences 410, for example, may specify that only those portlets which are database driven and therefore include dynamically generated content, are to be monitored and the usage of stored. In the example, portlet instances 810, 820, and 830 are instances of database driven portlets that dynamically generate content based on the current data specified for a selected data option. In contrast, search portlet instance 840 with a search entry interface 842 into which a user may enter any term is not an instance of a database driven portlet and is not marked as being recorded. In other embodiments, usage of portlets that are not database driven, such as search portlet 840, may be recorded. In addition, in other embodiments, graphical indicators 818, 828, and 838 or separate graphical indicators may be updated within portlet instances to indicate the usage of the portlet instance has been saved.

In the example, portal event adjuster 414 monitors events within the portal page illustrated at reference numeral 808, and responsive to detecting particular types of events, adjusts graphical characteristics of the portal page illustrated at reference numeral 808. In particular, portal event adjuster 414 monitors for user interaction with portlet instances and, responsive to detecting user interaction through selections within a particular portlet instance, portal event adjuster 414 adjusts a graphical characteristic of the particular portlet instance to indicate user interaction. In one example, portal event adjuster 414 detects a user interaction with financial portlet instance 810 by selecting from among menu 812 using cursor 806. Responsive to detecting the user interaction with financial portlet instance 810, portal event adjuster 414 graphically adjusts financial portlet instance 810 with highlighting, as illustrated, to indicate the user interaction with financial portlet instance 810 within the portal page illustrated at reference numeral 808.

It is important to note that, the portal page illustrated at reference numeral 808 includes a selectable return option depicted at reference numeral 844 which a user may select to trigger portal event adjuster 414 to remove highlighting indicating user interaction from portlet instances. In addition, selection of the selectable return option depicted at reference numeral 844 may trigger portal event adjuster 414 to adjust individual portlets with which a user interacted to return to the settings prior to the user interaction which triggered highlighting the individual portlets.

In the example, portal status recorder 402 records the portal usage within the portal page as illustrated with reference to multiple usage metadata records 852, 854, and 856 of portal status database 404. Portal status recorder 402 may determine from portal summary preferences 410, user inputs, and other specifications, which portal usage to record and which portions of selected portal usage metadata to record.

For example, portal status recorder 402 is directed, based on portal trigger event preferences 412, to periodically record portlet usage. In the example, the first automatically triggered periodic recording by portal status recorder 402 occurs at 10:10:00, as illustrated at reference numeral 852. In one example, portal trigger event preferences 412 may generate a trigger event for portal status recorder 402 to periodically record portal usage, such as recording one or more usage metadata records for the portlet usage.

In addition, portal status recorder 402 is directed, based on portal trigger event preferences 412, to record portal usage whenever portal event adjuster 414 adjusts the highlighting of a portlet to indicate user interaction with the portlet. In the example, responsive to portal event adjuster 414 adjusting the highlighting of financial portlet instance 810, portal status recorder 402 is triggered to record the usage metadata for financial portlet instance 810 as illustrated at reference numeral 854.

Further, for example, portal status recorder 402 is directed to record the content within portlet instance 810 responsive to the user selection of save option 814 using cursor 806 or other input for selecting to save the usage of financial portlet instance 810. As illustrated within portlet instances 810 and 820, save options 814 and 824 allow a user to select to save usage metadata for each of these portlet instances individually. In the example, when the user selects to save usage metadata of portlet instance 810 within portal status database 404 or another database that the user selects, portal status recorder 402 is triggered to record usage metadata for financial portlet instance 810 as illustrated at reference numeral 856 including, but not limited to, an identifier for portlet instance 810, the time of saving the content, the content itself, and the data option selected within portlet instance 810.

Subsequent to portal status recorder 402 storing records of portal usage metadata in portal status database 404, a user may request to view a summary of portal usage at different points during a range of time. In the example, the user selects to view a summary of portal usage during a time range from 10:00:00 to 10:20:00. Records 852, 854, and 856 are relevant to the search period range.

As illustrated, summary portal generator 408 generates a new summary portal page 858 within the display area. Using cursor 806, a user may select between portal page 808 and summary portal page 858 by selecting one of the tabs within a tab interface 860. In additional or alternate examples, summary portal generator 408 may open a separate window for displaying summary portal page 858. In addition, in additional or alternate examples, summary portal generator 408 may open summary portal page 858 within the browser or other interface at the client system where the client system interface specifies the interface for selecting between multiple portal pages.

In particular, summary portal generator 408 generates summary portal page 858 with a first selection of portlet instances representative of the portlets placed within portal page and the data options selected for those portlets, as recorded in record 852. For example, summary portal page 858 includes financial portlet instance 862 and spreadsheet portlet instance 866 representing the usage metadata reflective of portlet data option selections stored in record 852 at "10:10:00." In addition, summary portal page 858 includes a financial portlet instance 864 representing the usage metadata for financial portlet instance 810 captured in record 854 at "10:13:40" and includes a financial portlet instance 868 representing the usage metadata, and in particular the saved dynamically generated content, for financial portlet instance 810 captured in record 856 at "10:15:10". In particular, financial portlet instances 864 and 868 are highlighted, reflecting the highlighting included with the portlet metadata stored in records 854 and 856.

In the examples of records 852, 854, and 856, stored within portal status database 404 or one or more other databases selected by a user or portal summary controller, additional or alternate data that is available or analyzed may be stored with each of the records and displayed in the summary. For example, a record may include metadata for one or more portlets.

In addition, in the example of summary portal page 858, in other examples, the user may select or summary portal generator 408 may automatically generate a summary portal page reflective of only particular types of portal usage records. For example, summary portal page may only reflect records with portlet placement and data options selected or may only reflect records with portlet content stored. In addition, a user may select to limit summary portal page 858 to illustrating a particular type of portal usage by a selection of users.

Further, it is important to note that in another example, the summary portal page may be generated at a particular point in time and then be set for summary portal generator 408 to automatically update summary portal page each time portal status recorder 402 records a new record in portal status database 404.

Figure 9:
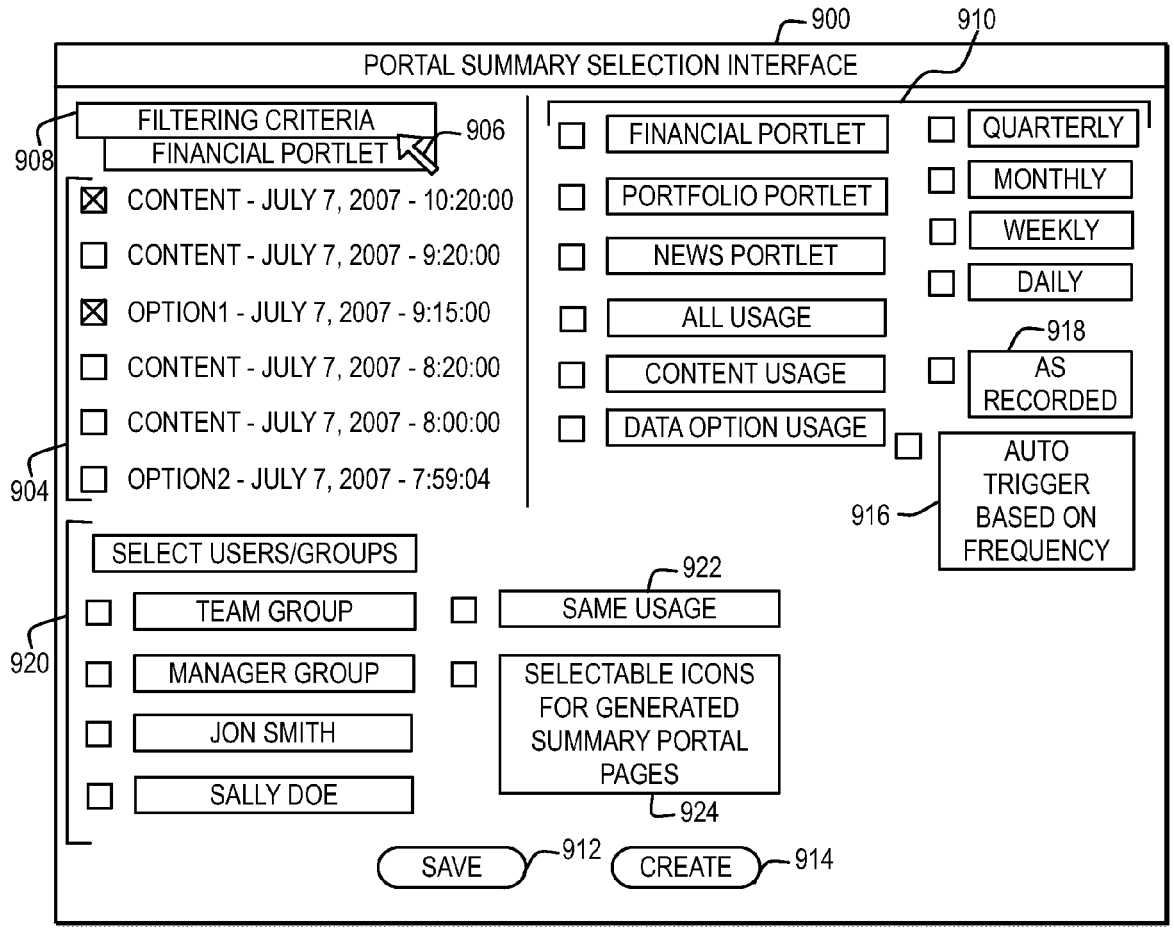
FIG. 9 is a block diagram depicting one example of a portal summary selection interface through which a user may select the portal usage metadata to apply when specifying portlet instances within a summary portal page.

With reference now to FIG. 9, a block diagram illustrates one example of a portal summary selection interface through which a user may select the portal usage metadata to apply when specifying portlet instances within a summary portal page. In the example of a portal summary selection interface 900 facilitated by portal summary selection interface controller 406, a user may select from a list of records of portal usage metadata stored in portal status database 404, as illustrated in the list at reference numeral 904. In particular, as illustrated in the example, the user may first select to view a filtered selection of the records of portal usage metadata stored in portal status database 404 by selecting a filtering criteria from a pull down menu 908 using a cursor 906 or other input which enables selection from a pull down list. In the example, a user has selected to view all records of portal usage metadata within portal status database 404, which include instances of a financial portlet. As illustrated, the examples of selectable records within portal status database 404, which include instances of a financial portlet, include time based records of saved dynamically generated content for the financial portlet and saved data option selections for the financial portlet. From among the filtered list illustrated at reference numeral 904 a user may further select which of the records to include within a summary portal page by individually selecting records using cursor 906 or other type of input option that enables selection from the list of records. In addition, although not depicted the filtered list of records of portal usage metadata may include user interactions, highlighting, time stamps of play clocks, and other types of data included in recorded metadata.

While the example illustrates the list of records of portal usage metadata from portal status database 404 filtered according to a type of portlet, in other examples, a user may select other filtering criteria such as a time range, whether the record is for content, whether the record is for an option, whether the record indicates the portlets opened at a particular time, and other criteria which distinguish a selection of records from among portal status database 404. In addition, while the example illustrates pull down menu 908 as providing the selectable options for filtering records from portal status database 404, in other examples, portal summary selection interface controller 406 may implement other types of interfaces through which a user may select filtering criteria.

In addition, in the example of portal summary selection interface 900, in addition to or as an alternative to selecting from the list at reference numeral 904, portal summary selection interface controller 406 may include options for specifying the types or categories of records to include within the portal summary page. In the example, as illustrated at reference numeral 910, a user may select from options including types of portlet instances, such as "financial portlets", "portfolio portlets", and "news portlets", frequency of portlet usage, such as "quarterly", "monthly", "weekly", or "daily", and may select whether to record all portal usage metadata types, content usage only or data option usage only. It will be understood that the category examples depicted at reference numeral 910 are for purpose of illustration of the types of options portal summary selection interface controller 406 may present within portal summary selection interface 900 and are not limiting on the types or formats of criteria a user is enabled to select from to specify the recorded portal usage to include within a summary portal page.

In particular, a user may also select an "as recorded" option 918 to add portlet instances reflecting all or selected types of records within portal status database 404 as the usage metadata records recorded by portal status recorder 402 and stored in portal status database 404. In one example, a user may select to open a summary portal page which will provide a summary of each of the portlet content changes throughout a session, by selecting the "content usage" option and "as recorded" option 918 within portal summary selection interface 900. By updating the summary portal page as the content changes within one or more other portal pages, the user may switch to view the summary portal page and view a record of previously displayed dynamic content over a particular time period.

In addition, portal summary selection interface controller 406 may provide an option for a user to select from among the portal usage metadata of multiple users. In the example, as illustrated at reference numeral 920, a user may select from a group of users, such as the users included in "team group" or "manager group" or individual users, such as "Jon Smith" or "Sally Doe". In addition, a user may be provided with an option to select from a type of user, such as all users who viewed portal pages over a particular period of time or all users who viewed portal pages including a particular type of content within a network of users.

Along with portal summary selection interface controller 406 providing an option for a user to select among the portal usage metadata of multiple users, portal summary selection interface controller 406 may also provide an option for a user to select to show the same usage among multiple users as illustrated at reference numeral 922 or to show selectable icons for or the pages themselves of generated summary portal pages by different users as illustrated at reference numeral 924.

In the example, a user may select a save option 912 to select to save selected options for specifying the portlet instances within a summary portal page. In addition, upon choosing the save option depicted at reference numeral 912, portal summary selection interface controller 406 may prompt the user to name the selected options for the summary portal page and portal summary selection interface controller 406 saves the selected options as a file or other data storage unit within summary portal selection database 416 or another storage system.

Through portal summary selection interface 900, a user may select options for multiple separate summary portal pages and may select to open separate summary portal pages by selecting to open one or more of the saved option files. For example, as illustrated, the user selects to save options for a summary portal page specified for the portal usage of the content of a financial portlet on "Jul. 7, 2007" at "10:20:00" and of a financial portlet instance set to data "option 1" on "Jul. 7, 2007" at "9:15:00." The user may later select the saved option file from summary portal selection database 416 to trigger summary portal generator 408 to create a summary portal page with portlet instances specified according to the saved records.

In addition, a user may select options for a summary portal page within portal summary selection interface 900 and select to create the summary portal page through selection of the create option depicted at reference numeral 914. When the user selects the create option illustrated at reference numeral 914, summary portal generator 408 detects the applicable metadata records from portal status database 404 designated by the user selected options and generates a summary portal page including portlet instances specified according to the applicable metadata records.

In addition, through portal summary selection interface 900, a user may select options for multiple separate summary portal pages, where the selected options trigger opening separate summary portal pages. For example, a user may select an option for a summary portal page with records for the news portlet as recorded daily. A user may further select an option 916 to automatically trigger a summary portal page, based on the selected frequency, such as triggering a summary portal page each day with portlet instances specified according to the metadata records of the news portlet for the day.

It will be understood that portal summary selection interface 900 may include additional or alternate options. In addition, it will be understood that a system administrator or user may specify the types of options to be included within portal summary selection interface 900. Further, a user may select to view portal summary selection interface 900 or portal summary selection interface controller 406 may automatically trigger display of portal summary selection interface 900 periodically or responsive to different conditions.

It is important to note that in addition to portal status recorder 402 monitoring portal usage metadata for one or more portal pages, portal status recorder 402 may monitor portal usage metadata for a summary portal page and records of portal usage metadata of a summary portal page may be included within portal summary selection interface 900 for user selection to include in another summary portal page. In one example, a summary portal page may include portlet instances specified according to recorded data options from portal status database 404, but the user could specify a preference to record the content accessed for the previously selected data options within the summary portal page and present the summary of the content recordings in the same or an alternate summary portal page.

It is also important to note that in displaying records from portal status database 404, portal summary interface controller 406 may detect which records within portal status database 404 include redundant information and graphically illustrate redundant records within portal summary selection interface 900. For example, if multiple records for a financial portlet include a same data option selection, each of the redundant records may be graphically highlighted to show the redundancy. In addition, portal summary selection interface controller 406 may include options within portal summary selection interface 900 to combine all redundant records into a single portlet instance within a summary portal page with timestamps displayed with the portlet instance for each of the redundant records.

Figure 10:
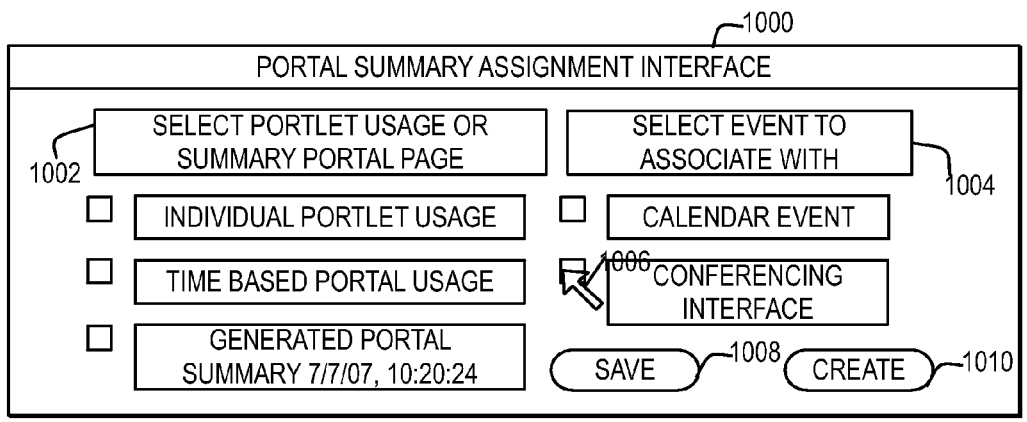
FIG. 10 is a block diagram illustrating an example of an interface for assigning stored portal usage metadata to an event.

Referring now to FIG. 10, a block diagram illustrates an example of an interface for assigning stored portal usage metadata to an event. In the example, a portal summary assignment interface 1000 is supported by portal summary controller 130 separate from an event-based application or within the interface of an event-based application. In the example, portal summary assignment interface 1000 includes an option for a user to select with cursor 1006 or other input tool the type of portlet usage or a particular summary portal page to associate with an event as illustrated at reference numeral 1002. For example, a user may select individual portlet usage, time based portal usage over a particular period of time, or a generated portal summary.

In addition, in the example, portal summary assignment interface 1000 includes an option for a user to select the type of event to associate with the portlet usage or summary portal page as illustrated at reference numeral 1004. For example, a user may select to associate usage with a particular calendar event or a conferencing interface. In particular, for example, a user may associate a record of portlet usage for an individual portlet with a particular calendar event, such as an upcoming meeting event, such that other users may access the record of portlet usage in a summary portal page.

Referring now to FIG. 11, a high level logic flowchart depicts a program and process for recording portal usage. In the example, the process starts at block 1100 and thereafter proceeds to block 1102. Block 1102 illustrates monitoring usage metadata indicating current usage of portlets within at least one portal page for at least one event specified to trigger storage of usage metadata from the portal trigger event preferences. Events specified to trigger storage may include, but are not limited to, user interaction with a portlet instance, highlighting or other graphical indicators of user interaction with a portlet instance, user opening or closing portlet instances or portal pages, user selection of buttons or other selectable options within a portlet instance such as a selection of a play or stop button, the type of or composition of content generated for or playing within a portlet instance meeting a requirement for a type of or composition of content within a portlet instance for generating a trigger event. Block 1104 depicts the portal summary controller determining whether a trigger to record portal usage is detected from a user selection to store the portal usage or based on a triggering event in the metadata. If the portal summary controller detects a trigger to record portal usage, then the process passes to block 1106. Block 1106 illustrates recording portal usage metadata by detecting at least one type of portal usage designated for recording by the trigger from the detected portal usage metadata and storing the recorded portal usage metadata in a record within the portal status database, and the process ends.

With reference now to FIG. 12, a high level logic flowchart illustrates a program and process for generating a summary portal page. In the example, the process starts at block 1200 and thereafter proceeds to block 1202. Block 1202 illustrates the portal summary controller determining whether a trigger to generate a summary portal page is detected. If the portal summary controller detects a trigger to generate a summary portal page, then the process passes to block 1204.

Block 1204 depicts accessing all applicable usage metadata records for the summary portal page from the portal status database. In determining applicable records, the portal summary controller may prompt the user to select from record options, may retrieve previously selected records, may detect record selections or rules for selecting records from the portal summary preferences, or may detect applicable records from other events or sources. Next, block 1206 illustrates generating a summary portal page with portal instances as specified according to the applicable usage metadata records. Thereafter, block 1208 depicts storing the summary portal page metadata when the portal page is generated as a summary portal page record, and the process ends.

Referring now to FIG. 13, a high level logic flowchart depicts a program and process for generating a recording trigger event responsive to highlighting a portal page to reflect user interaction with a portlet in the portal page. In the example, the process starts at block 1300 and thereafter proceeds to block 1302. Block 1302 illustrates tracking usage metadata including user interaction with a portal page. Next, block 1304 depicts a determination whether user interaction with the portal page is detected. If user interaction with the portal page is detected, then the process passes to block 1306. Block 1306 depicts comparing the detected user interaction with trigger event preferences, which specify the types of user interaction trigger highlighting. Next, block 1308 illustrates a determination whether there is a match between the type of user interaction and the types of user interaction triggering highlighting in the trigger event preferences. If there is not a match, then the process returns to block 1302. If there is a match, then the process passes to block 1310. Block 1310 depicts adjusting the highlighting in the portal page to indicate the portion of the portal page interacted with by the user. Next, block 1312 depicts generating a recording trigger event responsive to highlighting the portal page to indicate user interaction, and the process returns to block 1302. In addition, once a portion of the portal page is highlighted to indicate user interaction, a selectable option may be enabled, where a user may select the selectable option to remove highlighting or restore the portal page to the status of the page prior to the highlighting.

Referring now to FIG. 14, a high level logic flowchart depicts a program and process for specifying a summary portal page. In the example, the process stars at block 1400 and thereafter proceeds to block 1402. Block 1402 depicts the portal summary controller determining whether an option to specify a summary portal page is triggered or requested. If the portal summary controller detects a trigger to specify a summary portal page, then the process passes to block 1404.

Block 1404 illustrates displaying at one or more of (1) at least one usage option of a selection of portal usage records, types of portal usage records, and previously stored summary portal page records; (2) at least one time period option over which to access records; (3) at least one trigger option as to when to generate the summary portal page; and (4) at least one user option of a selection of user portal records to access. In addition, as previously described with reference to FIG. 9, the display may also include additional filtering options and may include options to automatically trigger summary portal page generation based on selected options.

Next, block 1406 depicts the portal summary controller determining whether the user has completed the summary portal page specification by selecting to save the selected options or create a summary page from the selected options. If the user selects to save or create a summary page from the selected options, then the process passes to block 1408. Block 1408 illustrates storing the user selections in a summary portal option file for defining a summary portal page.

Next, block 1410 illustrates a determination of which option was selected. If the save only option was selected, the process passes to block 1412. Block 1412 depicts setting the selected trigger option for when to trigger the summary portal page, whether responsive to a particular event or at a particular time, in the portal summary preferences, and the process ends. Otherwise, if the create option was selected, the process passes to block 1414. Block 1414 illustrates generating the summary portal page with the user selections, and the process ends.

While the invention has been particularly shown and described with reference to a preferred embodiment, it will be understood by those skilled in the art that various changes in form and detail may be made therein without departing from the spirit and scope of the invention.

What is claimed is:

1. A method for creating a portal page summarizing previous portal page usage comprising:
    monitoring usage metadata indicating current usage of at least one portlet within at least one portal page for one of a plurality of events specified to trigger storage of the usage metadata;
    responsive to detecting one of the plurality of events within the usage metadata, storing the detected usage metadata at a current time of at least one instance of at least one portlet application within the at least one portal page;
    storing usage metadata at a plurality of different times across a plurality of portal pages opened by a plurality of separate users; and
    subsequent to storing separate detected usage metadata at the plurality of different times, dynamically creating a summary portal page displaying a separate instance of the at least one portlet application for at least one of each of the plurality of different times specified according to the separate usage metadata stored at each of the plurality of different times for at least a selection of the plurality of separate users, such that the summary portal page comprises a summary of usage by the selection of the plurality of separate users.

2. The method according to claim 1, wherein monitoring usage metadata indicating current usage of at least one portlet within at least one portal page for one of a plurality of events specified to trigger storage of the usage metadata further comprises:
    monitoring usage metadata for an event indicating that at least one of an additional portlet instance is added to the at least one portal page or an additional portal page is opened, wherein the event of an additional portlet instance added to the at least one portal page or an additional portal page opened is one of the plurality of events specified to trigger storage of the usage metadata; and
    responsive to detecting the indicator that at least one of the additional portlet instance is added to the at least one portal page or the additional portal page is opened, triggering the storing of the detected usage metadata.

3. The method according to claim 1, wherein monitoring usage metadata indicating current usage of at least one portlet within at least one portal page for one of a plurality of events specified to trigger storage of the usage metadata further comprises:
   monitoring usage metadata for an event indicating a user interaction with a particular portlet instance;
   responsive to detecting the user interaction with a particular portlet instance, adjusting a graphical characteristic of the particular portlet instance to indicate the user interaction;
   monitoring usage metadata for an event indicating adjustment of the graphical characteristic of the particular portlet instance, wherein adjusting a graphical characteristic of at least one portlet instance to indicate user interaction is one of the plurality of events specified to trigger storage of the usage metadata; and
   responsive to detecting the event indicating adjustment of the graphical characteristic of the particular portlet instance, triggering the storing of the detected usage metadata.

4. The method according to claim 1, wherein monitoring usage metadata indicating current usage of at least one portlet within at least one portal page for one of a plurality of events specified to trigger storage of the usage metadata further comprises:
   monitoring usage metadata for an event indicating that a particular portlet instance with a media viewer opens media within the media viewer, wherein the event of opening media with the media viewer is one of the plurality of events specified to trigger storage of the usage metadata;
   responsive to detecting the event that the media viewer opens media within the media viewer, triggering the storing of the detected usage metadata, wherein the usage metadata comprises a timestamp of the play clock for the media within the media viewer;
   monitoring subsequent usage metadata for a second event indicating that the particular portlet instance with the media viewer stops play of the media within the media viewer, wherein the event of stopping play of media within the media viewer is one of the plurality of events specified to trigger storage of the usage metadata; and
   responsive to detecting the second event that the media viewer stops play of the media, triggering a second storing of the subsequent detected usage metadata at the time of the second event, wherein the subsequent detected usage metadata comprises a subsequent timestamp of the play clock for the media when play is stopped.

5. The method according to claim 1, wherein monitoring usage metadata indicating current usage of at least one portlet within at least one portal page for one of a plurality of events specified to trigger storage of the usage metadata further comprises:
   monitoring usage metadata for an event indicating a user selection of a one of the selectable options among a plurality of selectable options within a particular portlet instance, wherein the event of a user selection of one of the selectable options within the particular portlet instance is one of the plurality of events specified to trigger storage of the usage metadata; and
   responsive to detecting the event of the user selection of one of the selectable options within the particular portlet instance, triggering the storing of the detected usage metadata.

6. The method according to claim 1, further comprising:
   storing a file specifying the created summary portal page; and
   providing an interface for a user to select to open the stored file for the summary portal page; and
   responsive to the user selecting to open the stored file for the summary portal page, dynamically generating the summary portal page displaying the separate instance of the at least one portlet application for at least one of each of the plurality of different times specified according to the separate usage metadata stored at each of the plurality of different times.

7. The method according to claim 1, further comprising:
   presenting a graphical user interface for a user to select to save the summary portal page in association with one of a plurality of calendar events; and
   responsive to a user selection of at least one particular calendar event from among said plurality of calendar events, storing a portlet specification of the summary portal page in association with the at least one particular calendar event.

8. The method according to claim 1 wherein dynamically creating a summary portal page displaying a separate instance of the at least one portlet application for at least one of each of the plurality of different times specified according to the separate usage stored at each of the plurality of different times, such that the summary portal page provides a summary of previous usage of the at least one portal page further comprises:
   dynamically creating the summary portal page graphically distinguished from at least one other portal page and comprising a summary of said stored usage within at least one of a separate window and a tabbed window.

9. A system for creating a portal page comprising:
   a portal status recorder comprising at least one processor and a memory configured to:
   monitor usage metadata indicating current usage of at least one portlet within at least one portal page for one of a plurality of events specified to trigger storage of the usage metadata;
   responsive to detecting one of the plurality of events within the usage metadata, store the detected usage metadata at a current time of at least one instance of at least one portlet application within the at least one portal page;
   store usage metadata at a plurality of different times across a plurality of portal pages opened by a plurality of separate users; and
   a summary portal generator comprising the at least one processor and memory further configured to:
   dynamically create a summary portal page from stored separated detected usage metadata at a plurality of different times displaying a separate instance of the at least one portlet application for at least one of each of the plurality of different times specified according to the separate usage metadata stored at each of the plurality of different times for at least a selection of the plurality of separate users, wherein the summary portal page comprises a summary of usage by the selection of the plurality of separate users.

10. The system according to claim 9, the portal status recorder further configured to:
   monitor usage metadata for an event indicating that at least one of an additional portlet instance is added to the at least one portal page or an additional portal page is opened, wherein the event of an additional portlet instance added to the at least one portal page or an additional portal page opened is one of the plurality of events specified to trigger storage of the usage metadata; and responsive to detecting the indicator that at least one of the additional portlet instance is added to the at least one portal page or the additional portal page is opened, trigger the storing of the detected usage metadata.

11. The system according to claim 9, the portal status recorder further:

monitor usage metadata for an event indicating a user interaction with a particular portlet instance;

responsive to detecting the user interaction with a particular portlet instance, for adjust a graphical characteristic of the particular portlet instance to indicate the user interaction;

monitor usage metadata for an event indicating adjustment of the graphical characteristic of the particular portlet instance, wherein adjusting a graphical characteristic of at least one portlet instance to indicate user interaction is one of the plurality of events specified to trigger storage of the usage metadata; and responsive to detecting the event indicating adjustment of the graphical characteristic of the particular portlet instance, trigger the storing of the detected usage metadata.

12. The system according to claim 9, the portal status recorder further configured to:

monitor usage metadata for an event indicating that a particular portlet instance with a media viewer opens media within the media viewer, wherein the event of opening media with the media viewer is one of the plurality of events specified to trigger storage of the usage metadata;

responsive to detecting the event that the media viewer opens media within the media viewer, trigger the storing of the detected usage metadata, wherein the usage metadata comprises a timestamp of the play clock for the media within the media viewer;

monitor subsequent usage metadata for a second event indicating that the particular portlet instance with the media viewer stops play of the media within the media viewer, wherein the event of stopping play of media within the media viewer is one of the plurality of events specified to trigger storage of the usage metadata; and responsive to detecting the second event that the media viewer stops play of the media, trigger a second storing of the subsequent detected usage metadata at the time of the second event, wherein the subsequent detected usage metadata comprises a subsequent timestamp of the play clock for the media when play is stopped.

13. The system according to claim 9, the portal status recorder further configured to:

monitor usage metadata for an event indicating a user selection of a one of the selectable options among a plurality of selectable options within a particular portlet instance, wherein the event of a user selection of one of the selectable options within the particular portlet instance is one of the plurality of events specified to trigger storage of the usage metadata; and responsive to detecting the event of the user selection of one of the selectable options within the particular portlet instance, trigger the storing of the detected usage metadata.

14. The system according to claim 9, further comprising:

the portal summary recorder for storing a file specifying the created summary portal page; and a portal summary selection interface controller for providing an interface for a user to select to open the stored file for the summary portal page; and responsive to the user selecting to open the stored file for the summary portal page, the summary portal generator for dynamically generating the summary portal page displaying the separate instance of the at least one portlet application for at least one of each of the plurality of different times specified according to the separate usage metadata stored at each of the plurality of different times.

15. The system according to claim 9, further comprising:

a portal summary selection interface controller for presenting a graphical user interface for a user to select to save the summary portal page in association with one of a plurality of calendar events; and responsive to a user selection of at least one particular calendar event from among said plurality of calendar events, the portal status recorder for storing a portlet specification of the summary portal page in association with the at least one particular calendar event.

16. The system according to claim 9, the summary portal generator for dynamically creating the summary portal page graphically distinguished from at least one other portal page and comprising a summary of said stored usage within at least one of a separate window and a tabbed window.

17. A program product comprising a storage-type computer-usable medium including a computer-readable program for creating a portal page summarizing previous portal page usage, wherein the computer-readable program when executed on a computer causes the computer to:

monitor usage metadata indicating current usage of at least one portlet within at least one portal page for one of a plurality of events specified to trigger storage of the usage metadata;

responsive to detecting one of the plurality of events within the usage metadata, store the detected usage metadata at a current time of at least one instance of at least one portlet application within the at least one portal page;

store usage metadata at a plurality of different times across a plurality of portal pages opened by a plurality of separate users; and subsequent to storing separate detected usage metadata at the plurality of different times, dynamically create a summary portal page displaying a separate instance of the at least one portlet application for at least one of each of the plurality of different times specified according to the separate usage metadata stored at each of the plurality of different times for at least a selection of the plurality of separate users, wherein the summary portal page comprises a summary of usage by the selection of the plurality of separate users.

18. The program product of claim 17, wherein the computer-readable program is transmitted over a network.

* * * * *